(12) United States Patent
Ghosh et al.

(10) Patent No.: US 7,948,986 B1
(45) Date of Patent: May 24, 2011

(54) APPLYING SERVICES WITHIN MPLS NETWORKS

(75) Inventors: Kaushik Ghosh, Sunnyvale, CA (US);
Kireeti Kompella, Los Altos, CA (US);
Kannan Varadhan, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 198 days.

(21) Appl. No.: 12/392,740

(22) Filed: Feb. 25, 2009

Related U.S. Application Data

(60) Provisional application No. 61/149,197, filed on Feb. 2, 2009.

(51) Int. Cl.
*H04L 12/56* (2006.01)
(52) U.S. Cl. ........................... 370/392; 370/401
(58) Field of Classification Search .................. None
See application file for complete search history.

(56) References Cited

U.S. PATENT DOCUMENTS

| | | | |
|---|---|---|---|
| 6,618,760 B1 | 9/2003 | Aramaki et al. | |
| 6,857,026 B1 | 2/2005 | Cain | |
| 6,859,842 B1 * | 2/2005 | Nakamichi et al. | 709/238 |
| 7,082,102 B1 | 7/2006 | Wright | |
| 7,359,328 B1 * | 4/2008 | Allan | 370/236.2 |
| 7,463,591 B1 | 12/2008 | Kompella et al. | |
| 2002/0080794 A1 | 6/2002 | Reeves et al. | |
| 2004/0151180 A1 * | 8/2004 | Hu et al. | 370/392 |
| 2004/0213264 A1 | 10/2004 | Mistry et al. | |
| 2004/0223500 A1 | 11/2004 | Sanderson et al. | |
| 2005/0068933 A1 | 3/2005 | Kokkonen et al. | |
| 2005/0083936 A1 | 4/2005 | Ma | |
| 2005/0169264 A1 * | 8/2005 | Kim et al. | 370/389 |
| 2006/0291445 A1 * | 12/2006 | Martini et al. | 370/351 |
| 2007/0133529 A1 * | 6/2007 | Lee et al. | 370/389 |

OTHER PUBLICATIONS

U.S. Appl. No. 11/192,747, filed Jul. 29, 2005 entitled, "Filtering Traffic Based on Associated Forwarding Equivalence Classes,".
Office Action for U.S. Appl. No. 11/192,747 dated Dec. 8, 2009, 25 pgs.
Response to Office Action for U.S. Appl. No. 11/192,747 dated Feb. 8, 2010, 15 pgs.

* cited by examiner

*Primary Examiner* — Chirag G Shah
*Assistant Examiner* — Salvador E Rivas
(74) *Attorney, Agent, or Firm* — Shumaker & Sieffert, P.A.

(57) ABSTRACT

In general, techniques are described that facilitate application of service within MPLS networks. More specifically, a router comprises a forwarding plane, a service plane and a routing engine. The routing engine maintains data defining an association between a handle identifying a property common to a plurality of packets of a particular context and one or more MPLS labels associated with these packets. The routing engine automatically generates and installs a filter to identify these packets within both the forwarding and service planes. The forwarding plane applies the filter to incoming packets to determine whether each of the incoming packets includes a label matching any of the labels of the filter and forwards the incoming packets to the service plane upon a match. The service card selects one or more services identified by the filter and applies the selected one or more services to the incoming packet.

42 Claims, 6 Drawing Sheets

APPLYING SERVICES WITHIN MPLS NETWORKS

This application claims the benefit of U.S. Provisional Application No. 61/149,197, filed Feb. 2, 2009, the entire content of which is incorporated herein by reference.

TECHNICAL FIELD

The invention relates to computer networks and, more particular, network devices that route data through computer networks.

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission.

Packet-based computer networks increasingly utilize label switching protocols for traffic engineering and other purposes. Multi-Protocol Label Switching (MPLS) is a mechanism used to engineer traffic patterns within Internet Protocol (IP) networks. MPLS may be viewed as a protocol that allows packet-based networks to emulate certain properties of a circuit-switched network. By utilizing MPLS, a source device can request a path through a network to a destination device, i.e., a Label Switched Path (LSP). An LSP defines a distinct path through the network to carry MPLS packets from the source device to a destination device. Each router along an LSP allocates a label and propagates the label to the closest upstream router along the path for use in forwarding MPLS packets along the path. Routers along the path cooperatively perform MPLS operations to forward the MPLS packets along the established path.

Routers that originate the LSP are commonly known as ingress routers, while routers that terminate an LSP are commonly known as egress routers. Ingress and egress routers are more generally referred to as label edge routers (LERs). Internal routers along the LSP or other routers that support MPLS services are commonly referred to as label switching routers (LSRs). A set of packets to be forwarded along the LSP is typically referred to as a forwarding equivalence class (FEC). A FEC, for example, may specify any packets associated with a particular destination address or prefix, as well as, define quality of service (QoS) characteristics for the set of packets. A plurality of FECs may exist for each LSP, but there may be only one LSP for any given FEC. The LSRs utilize MPLS protocols to receive MPLS label mappings from downstream LSRs and to advertise MPLS label mappings to upstream LSRs. The ingress LER uses routing information, propagated from the next downstream LSR to determine the LSP, to assign labels for the LSP, and to affix a label to each packet of the FEC when forwarding the packet, thereby forming an MPLS packet and admitting the packet to the LSP. When an intermediate LSR along an LSR receives an MPLS packet from an upstream router, it switches the MPLS label according to the information in its forwarding table and label space, and forwards the packet to the appropriate downstream LSR or LER along the LSPR. The next router along the LSP is commonly referred to as a downstream router or a next hop. The egress LER removes the label from the packet and forwards the packet to its destination in accordance with standard routing protocols.

Often, LERs may establish one LSP through the network and then remove the first LSP and establish a second different LSP through the network. In this respect, LSPs may be considered transient, and the LERs and LSRs may continually advertise changes to their respective label mappings to represent the changing configuration of LSPs. The labels assigned for each LSP may too be considered transient, as the LERs and LSRs, in response to the label advertisements, may assign or reassign labels to different FECs. In this manner, LERs and LSRs may quickly reconfigure LSPs (and as a result label mappings) to address particular forwarding requirements of a particular class of packet or FECs.

Yet, the transient nature of labels may limit the use of labels as a static handle by which to identify packets associated with a particular context, as the context in which a given label may be employed may continually change. For example, a label, at one point in time, may be associated with a first FEC, and therefore a first LSP, that identifies packets destined for a particular destination, e.g., Virtual Private Network (VPN) site. At a second point in time, the same label may be associated with a second FEC different from the first FEC that identifies packets destined for a completely different destination, e.g., a Virtual Private Large Area Network (LAN) Service (VPLS) site. Moreover, as labels are locally allocated and advertised upstream by each LSR, the exact contextually meaning of any given label may be difficult to determine by other network devices. As a result, labels, while they may facilitate forwarding in a variety of contexts, may not provide an adequate handle by which to identify packets associated with a particular context.

SUMMARY

In general, techniques are described for applying services within a Multi-Protocol Label Switching (MPLS) network. The services may include security services, such as a Network Address Translation (NAT), firewall service, and an anti-virus service, as well as, other services, such as a time stamping service, an accounting service, and the like. The techniques, when implemented by a network device, such as a router, may enable an administrator to more easily define and install filters or rules by which the router identifies a plurality of packets associated with a particular context. The router may then apply the filters to each MPLS packet of network traffic to identify the plurality of MPLS packets associated with the particular context and, after identifying these packets, apply one or more services to each of the plurality of MPLS packets.

The techniques may facilitate definition of the filter by enabling the administrator or other user to define a handle by which the router is able to identify the plurality of MPLS packets of the particular context. The handle may comprise a property common to each of the plurality of packets of the particular context, such as a Label Switched Path (LSP) name, a Forwarding Equivalence Class (FEC) identifier or ID associated with a downstream assigned label, a FEC ID associated with an upstream assigned label, a context defined by a context label, a Virtual Private Large Area Network (LAN) Service (VPLS) site identifier or ID, a Layer two (2) Virtual Private Network (L2VPN) site identifier or ID, or any other identifier or characteristic common to one or more packets of a particular context. Typically, the handle identifies a property that is more user-understandable or -friendly when compared to non-descript numeric labels that provide little if any context by which to understand payload of the packet, such as a conventional numeric label pre-pended to an MPLS packet in accordance with an MPLS signaling protocol. This more user-understandable handle may, for example, remain more static than transient labels, thereby better enabling an administrator to remember and utilize the handle when defining filters.

Moreover, each router may still maintain a separate label space from which each LSR randomly assigns a label to different LSPs through the network. As LSPs are established and removed or torn-down within the network, the routers may continually update each label space to reflect the changing use of labels. The techniques may enable the router to automatically maintain an association between the handle assigned to an LSP and one or more labels that identify the plurality of packets of the particular context to which the router applies services. The router may, in this manner, dynamically update the handle/label association to reflect the changing use of labels, rather than require an administrator to continually redefine the filters to accommodate changes to the use of labels. As a result, the handle may identify or define a more static property by which to identify the plurality of packets of the particular context when compared to the MPLS labels used for forwarding the packets, and the router may automatically and dynamically maintain the association between the property and those labels used within its internal MPLS label space so as to easily identify packets having the common property. In this way, the administrator may interact with a user interface of the router to define the filters once using the more static properties and the router, without any further administrator interaction, may automatically maintain and update the filters based on label changes or reallocations to nevertheless still correctly identify the appropriate plurality of packets of the particular context.

In operation, the router may receive configuration information specifying both the handle and one or more of the services from the administrator. The router may parse the configuration information to extract the handle, and then, with a routing plane of the router, identify and/or allocate one or more MPLS labels of a label space maintained by the routing plane that are associated with the common property defined by the handle. The routing plane of the router may next automatically generate the filter such that the filter associates the one or more identified labels with an action to be applied to packets carrying the corresponding MPLS labels. The action may indicate that incoming MPLS packets received by a forwarding plane of the router having one or more labels that match the labels specified by the filter (which may be referred to herein as a "filter label") are to be forwarded to a service plane of the router for application of the one or more services specified by the administrator. The routing plane may then install the filter into forwarding hardware of the forwarding plane of the router, whereupon the router begins applying the filter to incoming packets.

The forwarding plane of the router may, for example, receive an incoming packet having at least one label referred to as a "packet label" and apply the filter to determine whether the filter labels match the packet label. If no match occurs, the forwarding plane proceeds to forward the incoming packet to its destination without forwarding the incoming packet to the service plane. However, if a match occurs, the forwarding plane takes the action specified by the filter and forwards the incoming packet to the service plane, which then applies the one or more services specified by the administrator. In this respect, the techniques may facilitate the application of services within label switched networks through automatic maintenance of filters that identify the plurality of packets to which the router applies one or more services. The use of a human understandable or usable handle may ease filter configuration as an administrator may more readily identify the plurality of packets by the common property defined by the handle rather than a nondescript label identifier. The handle combined with automatic maintenance may therefore improve application of services to the plurality of packets and reduce administrative burdens.

In one embodiment, a method comprises receiving, with a routing engine of a router of a network, input defining a filter that specifies (1) a user-defined handle that identifies a property common to a plurality of packets of a particular context, and (2) one or more services to be applied to the plurality of packets, with the routing engine, automatically installing the filter within a service plane of the router, and maintaining, with the routing engine, data that defines an association between the handle and one or more Multi-Protocol Label Switching (MPLS) labels assigned to forward the plurality of packets of the particular context along a label switched patch (LSP). The method further comprises, with the routing engine, automatically generating and installing within a forwarding plane of the router a forwarding-plane filter that specifies one or more of the MPLS labels for filtering the network traffic, applying, with the forwarding plane, the automatically generated forwarding-plane filter to an incoming MPLS packet of the network traffic to inspect only a label stack of the incoming packet without inspecting a remaining portion of a header and a payload of the packet to determine whether the label stack of the MPLS packet contains any of the one or more MPLS labels and, when the MPLS packet contains any of the MPLS labels of the filter, forwarding the MPLS packet and additional context information from the forwarding plane to the service plane of the router. The method also comprises, with the services plane of the router, applying the filter to the packet to select one or more of the services based on the additional context information received from the forwarding plane, and applying, with the service plane, the selected one or more of the services to the incoming MPLS packet received from the forwarding plane.

In another embodiment, a router comprises a service plane, a forwarding plane, and a routing engine. The routing engine receives input defining a filter that specifies (1) a user-defined handle that identifies a property common to a plurality of packets of a particular context, and (2) one or more services to be applied to the plurality of packets, automatically installs the filter within the service plane, maintains data that defines an association between the handle and one or more Multi-Protocol Label Switching (MPLS) labels assigned to forward the plurality of packets of the particular context along a label switched patch (LSP), automatically generates a forwarding-plane filter, and installs within the forwarding plane the forwarding-plane filter that specifies one or more of the MPLS labels for filtering the network traffic. The forwarding plane includes a forwarding component that applies the automatically generated forwarding-plane filter to an incoming MPLS packet of the network traffic to inspect only a label stack of the incoming packet without inspecting a remaining portion of a header and a payload of the packet to determine whether the label stack of the MPLS packet contains any of the one or more MPLS labels and, when the MPLS packet contains any of the MPLS labels of the filter, forwards the MPLS packet and additional context information to the service plane. The service plane includes at least one service card that applies the filter to the packet to select one or more of the services based on the additional context information received from the forwarding plane and applies the selected one or more of the services to the incoming MPLS packet received from the forwarding plane.

In another embodiment, a network system comprises a customer network and a packet-based network coupled to the customer network that employs a label switching protocol to establish paths by which to forward data, wherein the packet-based network includes a router. The router comprises a service plane, a forwarding plane and a routing engine. The routing engine receives input defining a filter that specifies (1) a user-defined handle that identifies a property common to a plurality of packets of a particular context, and (2) one or more services to be applied to the plurality of packets, automatically installs the filter within the service plane, maintains data that defines an association between the handle and one or more Multi-Protocol Label Switching (MPLS) labels assigned to forward the plurality of packets of the particular context along a label switched patch (LSP), automatically generates a forwarding-plane filter, and installs within the forwarding plane the forwarding-plane filter that specifies one or more of the MPLS labels for filtering the network traffic. The forwarding plane includes a forwarding component that applies the automatically generated forwarding-plane filter to an incoming MPLS packet of the network traffic to inspect only a label stack of the incoming packet without inspecting a remaining portion of a header and a payload of the packet to determine whether the label stack of the MPLS packet contains any of the one or more MPLS labels and, when the MPLS packet contains any of the MPLS labels of the filter, forwards the MPLS packet and additional context information to the service plane. The service plane includes at least one service card that applies the filter to the packet to select one or more of the services based on the additional context information received from the forwarding plane and applies the selected one or more of the services to the incoming MPLS packet received from the forwarding plane.

In another embodiment, a computer-readable storage medium comprises instructions for causing a programmable processor to receive, with a routing engine of a router of a network, input defining a filter that specifies (1) a user-defined handle that identifies a property common to a plurality of packets of a particular context, and (2) one or more services to be applied to the plurality of packets, with the routing engine, automatically install the filter within a service plane of the router, and maintain, with the routing engine, data that defines an association between the handle and one or more Multi-Protocol Label Switching (MPLS) labels assigned to forward the plurality of packets of the particular context along a label switched patch (LSP). The instructions further cause the programmable processor to, with the routing engine, automatically generate and install within a forwarding plane of the router a forwarding-plane filter that specifies one or more of the MPLS labels for filtering the network traffic, apply, with the forwarding plane, the automatically generated forwarding-plane filter to an incoming MPLS packet of the network traffic to inspect only a label stack of the incoming packet without inspecting a remaining portion of a header and a payload of the packet to determine whether the label stack of the MPLS packet contains any of the one or more MPLS labels and, when the MPLS packet contains any of the MPLS labels of the filter, forward the MPLS packet and additional context information from the forwarding plane to the service plane of the router. The instructions also cause the programmable processor to, with the services plane of the router, apply the filter to the packet to select one or more of the services based on the additional context information received from the forwarding plane and apply, with the service plane, the selected one or more of the services to the incoming MPLS packet received from the forwarding plane.

In another embodiment, a method comprises presenting, with a router of a network, a plurality of user-defined handles and a plurality of actions via at least one user interface to a user, wherein each of the user-defined handles identifies a property common to a plurality of packets of a particular context, receiving, with the router, configuration information from the user indicating the one of the plurality of handles and the one or more of the plurality of actions selected by the user and storing, with the router, the configuration information to define a logical filter that specifies (1) the indicated one of the handles, and (2) the indicated one or more actions to be applied to the plurality of packets. The method also comprises automatically generating, with the router, a filter that associates the identified handle of the logical filter to one or more labels assigned to forward the plurality of packets of the particular context along a label switched patch (LSP), applying, with the router, the automatically generated filter to a packet of the network traffic to determine whether the packet contains any of the one or more labels, and when the packet contains any of the labels of the filter, performing, with the router, the one or more actions indicated by the filter.

In another embodiment, a router comprises a control unit that presents a plurality of user-defined handles and a plurality of actions via at least one user interface to a user, wherein each of the user-defined handles identifies a property common to a plurality of packets of a particular context and receives configuration information from the user indicating the one of the plurality of handles and the one or more of the plurality of actions selected by the user, stores the configuration information to define a logical filter that specifies (1) the indicated one of the handles, and (2) the indicated one or more actions to be applied to the plurality of packets and automatically generates a filter that associates the identified handle of the logical filter to one or more labels assigned to forward the plurality of packets of the particular context along a label switched patch (LSP). The router also comprises at least one interface card to receive network traffic that includes a packet, wherein the control unit applies the automatically generated filter to the packet to determine whether the packet contains any of the one or more labels, and when the packet contains any of the labels of the filter, performs the one or more actions indicated by the filter.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
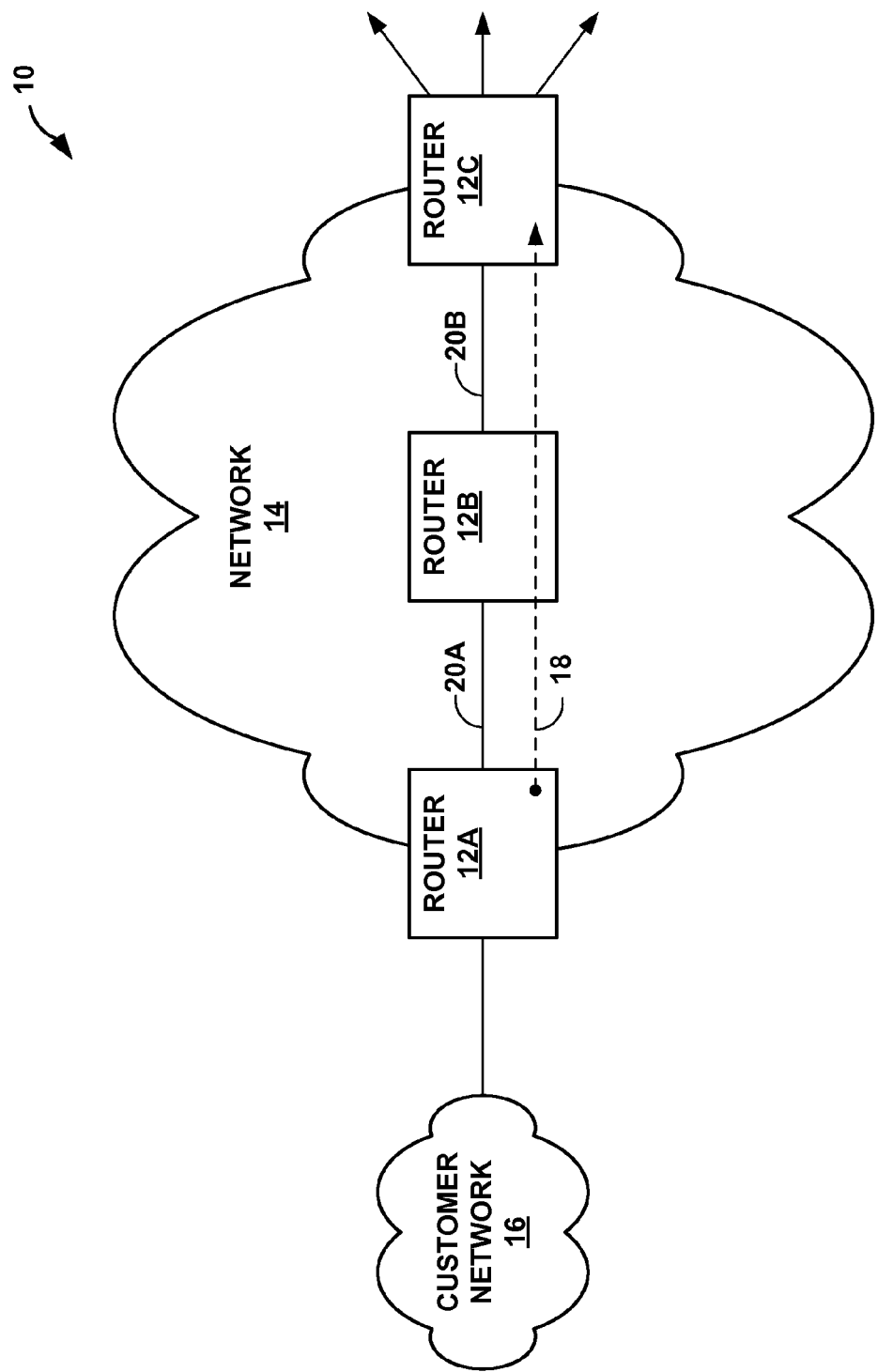
FIG. 1 is a block diagram illustrating a network system in which one or more routers performs the label context transmission techniques described in this disclosure.

FIG. 1 is a block diagram illustrating a network system 10 in which one or more of routers 12A-12C performs the label context transmission techniques described in this disclosure. Routers 12A-12C ("routers 12") may each represent a network device that forwards or "switches" data units, such as packets or cells, via a set path or route through a network, such as network 14, according to labels associated with each data unit. Accordingly, each of routers 12 may represent and be referred to herein as a "Label Switching Router" or LSR. While described with respect to this particular type of network device, e.g., routers 12, any network device capable of forwarding data units according to labels may implement the techniques described herein to facilitate application of services within a label switching network, such as network 14. Moreover, while described with respect to a Multi-Protocol Label Switching (MPLS) family of label distribution protocols, the techniques may be implemented with respect to any protocol cable of distributing labels or any general label distribution protocol and should not be limited to MPLS label distribution protocols.

As shown in FIG. 1, network system 10 includes a network 14 and a customer network 16. Network 14 may represent a public network that is owned and operated by a service provider to interconnect a plurality of edge networks, such as customer network 16. As a result, network 14 may be referred to herein as a Service Provider (SP) network or, alternatively, as a "core network" considering that network 14 acts as a core to interconnect a plurality of member or edge networks similar to customer network 16. Exemplary service providers include Verizon Communications Inc. or American Telephone & Telegraph (AT&T) Company. These service providers may lease portions of network 14 or provide services offering interconnection through network 14 to customer network 16, which may lease the portions or purchase the services provided by network 14.

Customer network 16 may represent a network owned and operated by a large entity, such as a university, corporation, business, or other facility or enterprise. Customer network 16 may operate according to a wide variety of network protocols, such as any of the 802.3x family of network protocols related to the Ethernet protocol, any of the 802.1x family of wireless networking protocols, an Internet Protocol (IP) protocol, an Asynchronous Transfer Mode (ATM) protocol, and a Transmission Control Protocol (TCP). Moreover, customer network 16 may comprise a Virtual Private Network (VPN), a Large Area Network (LAN), or a Wide Area Network (WAN). Although not shown in FIG. 1 for ease of illustration purposes, customer network 16 may include a wide variety of interconnected computing devices or nodes, such as web servers, print servers, application servers, data servers, workstations, desktop computers, laptop computers, cellular or other mobile devices, Personal Digital Assistants (PDAs), and any other device cable of connecting to a computer network via a wireless and/or wired connection.

Network 14 may interconnect the plurality of customer networks according to any number of protocols. Commonly, however, a transit network, such as network 14, that interconnects various customer networks 16 to one another implements a mechanism or protocol for quickly switching data units, which may comprise packets, cells or any other discrete unit of data. Often, these transit networks that implement these mechanisms are referred to as a "data-switched network" or "packet-switched network." Moreover, these transit networks, being packet based, may implement IP and as a result may be referred to as an "IP network" or an "IP packet-based network."

Multi-Protocol Label Switching (MPLS) refers to one exemplary mechanism or category of protocols that network 14 may implement to switch data units via one or more paths through network 14. For purposes of illustration, it is assumed herein that network 14 implements the MPLS data-carrying mechanism (e.g., one or more of the MPLS protocols). Network 14 may therefore be referred to herein as an "MPLS network 14." While described below with respect to the MPLS category of protocols, the techniques may be utilized by any network device that implements any protocol by which to forward data units according to labels through a network.

The MPLS protocols may execute between layer 2 and layer 3 of the Open Systems Interconnection (OSI) model and are often referred to as layer 2.5 protocols. Network 14 may implement one or more of the MPLS protocols to transmit many different types of data units that correspond to different protocols, including IP packets, Asynchronous Transfer Mode (ATM) cells, Ethernet frames and Synchronous Optical NETworking (SONET) frames, hence the name "multi-protocol label switching." Included within the MPLS category of protocols are one or more other protocols that network 14 may implement to establish the one or more paths through the network, such as a Label Distribution Protocol (LDP), and manage the path, such as a Resource Reservation Protocol (RSVP) or extensions thereof (e.g., a so-called RSVP Traffic Engineering or RSVP-TE protocol). Further information regarding MPLS and the various features of MPLS, as well as, general architectural information regarding MPLS can be found in Request for Comments (RFC) 3031, titled "Mutiprotocol Label Switching Architecture," prepared by the Network Working Group of the Internet Engineering Task Force (IETF), dated January 2001, herein incorporated by reference.

Network 14 may, for example, implement RSVP or LDP to establish at least one label switched path 18 through network 14. More particularly, network 14 may include the above described plurality of routers 12 which may, as described above, represent LSRs. Routers 12A and 12C may each reside at an edge of network 14, and as a result may each be referred to herein as a "Label Edge Router" or LER. Typically, LERs, such as routers 12A, 12C, establish the one or more paths through network 14 in accordance with a network protocol, such as LDP. Further information regarding LDP, the various services and features of LDP, as well as, general information regarding labels and the applicability of LDP to MPLS can be found in Request for Comments (RFC) 3037, titled "LDP Applicability," prepared by the Network Working Group of the Internet Engineering Task Force (IETF), dated January 2001, herein incorporated by reference.

In the example of FIG. 1, router 12A establishes a path 18 through network 14 that flows from router 12A to router 12B via link 20A and from router 12B to router 12C via link 20B. A path, such as path 18, typically represents a unidirectional flow of network traffic that is established according to one of the MPLS signaling protocol (e.g., LDP). For bi-directional traffic, routers 12 may establish a pair of unidirectional paths, and the techniques should not be limited strictly to traffic in one direction.

In any event, when router 12A establishes path 18 in accordance with LDP, path 18 may only transmit or carry network traffic from router 12A to router 12C but may not transmit or carry network traffic from router 12C to router 12A. Considering this unidirectional flow of network traffic along a given path, for each path, one router may be referred to as an "ingress network device" while another router may be referred to as an "egress network device." With respect to path 18, router 12A may represent the ingress network device, as router 12A acts as a point of ingress for network traffic to enter path 18, and router 12C may represent the egress network device, as router 12C may represent a point of egress for the network traffic from path 18. Router 12B, as it neither acts as an ingress point for traffic entering path 18 nor an egress point for traffic leaving path 18, may be referred to as a "transit router" or, more generally, a "transit network device."

Router 12A may establish path 18 by first discovering other of routers 12 that implement LDP. These other routers 12 may be referred to as "LDP peers." Upon discovering each LDP peer, router 12A may initiate an LDP session with the discovered one of routers 12. Router 12A may then, via the LDP session, negotiate parameters for the LDP session, such as a method by which to exchange labels. After negotiating the parameters, router 12A and the other one of routers 12 exchange one or more labels in accordance with the negotiated parameters.

Router 12A may, for example, establish an LDP session with router 12B to exchange labels. Router 12A may, via the established LDP session, advertise bindings between a Forwarding Equivalence Class (FEC) and a label. A FEC refers to a set of data units that a given network device forwards to the same next hop out of the same interface with the same treatment, e.g., quality or class of service. A label may uniquely identify a FEC and each of routers 12 may maintain a plurality of FECs. Router 12A may also receive bindings between FECs and labels from router 12B. Router 12A may resolve the bindings received from router 12B with those already maintained by router 12A to resolve paths through network 14. Routers 12 may each perform this exchange until each of routers 12 maintains a representation of a topology of network 14.

Based on this topology, routers 12 may resolve the topology to determine the one or more paths through network 14 by which to forward packets associated with each FEC. In some instances, these bindings may be referred to below as a binding or association between a label and a next hop, as the FEC may be used to determine the next hop along a given path. Based on these bindings, each path through network 14 may be associated with one or more and, often a plurality of labels, identifying each subsequent next hop along the path. Router 12A may also reserve bandwidth or other resources via the managing aspect or protocol of MPLS, e.g., RSVP. In this manner, router 12A may ensure a particular quality, level or class of service for a given path. For example, router 12A may reserve 10 mega-bits per second (Mbps) of bandwidth for path 18 in accordance with RSVP. These MPLS protocols (e.g., LDP and RSVP) may each represent or be referred to herein as an "MPLS signaling protocol," as these protocols signal a path and the reservation of resources along the path within the network.

After establishing path 18 by exchanging control plane signaling messages in accordance with one of the MPLS protocols, router 12A may receive a data unit (e.g., an IP packet) from customer network 16. Upon receiving the packet, router 12A may determine to which of a plurality of FECs the packet belongs by inspecting the data unit and, based on the determined FEC, append a corresponding label to the data unit. The label may be appended to the data unit as an MPLS header that includes or defines a label stack of one or more labels. Much like a software stack data structure, router 12A may push the corresponding label onto the label stack of the MPLS header. Router 12A may then route the data unit along a given path through network 14 based on the label.

Assuming router 12A forwards the data unit via path 18, router 12B receives the data unit with the appended label. Router 12B may then swap the label with another label that router 12B associates with path 18, where the swap may comprise removing or popping the original label appended by router 12A to the label stack and pushing or appending the label maintained by router 12B for path 18 onto the label stack. Router 12B may swap labels because labels may not be unique to a given path. In other words, each of routers 12 may maintain a separate label space, which in some instances may overlap. Router 12A may, for example, append a label for a first path and router 12B may append the same label for a second path different from the first. Thus, each of routers 12 may maintain conflicting label spaces. To resolve this issue, each of routers 12 may swap labels to correctly identify each next hop along a path through network 14.

After receiving the data unit and swapping the labels, router 12B may forward the data unit via link 20B to router 12C along path 18. Router 12C may inspect the label pushed by router 12B, and determine that the label identifies path 18, which requires router 12C to remove the data unit from path 18 and forward it to its destination. Router 12C may remove or pop the label from the label stack of the MPLS header, and forward the data unit to the destination indicated in to original data unit header, such as an IP header, instead of forwarding the data unit based on a label in the MPLS header. Router 12C may then forward the data unit to the destination via any one of a number of routes, as indicated in FIG. 1 by the plurality of arrows exiting network 14 from router 12C. In this manner, network 14 may implement one or more MPLS protocols to establish paths and switch data units along the paths according to the labels associated with the paths. In this respect, paths, such as path 18, may be referred to as a Label Switched Path (LSP).

Network 14 may implement MPLS for a number of reasons. First, MPLS moves path selection and route decisions to the edges of the network, thereby improving forwarding performance in the core of the network. To illustrate, in the above example, only routers 12A, 12C (or LERs) inspect the data unit to determine to which FEC the data unit belongs and the destination indicated by the original data unit, respectively. Transit router 12B, however, forwards the data unit based on the appended label and may forgo further packet inspection. While LERs, such as routers 12A, 12C, may establish and terminate paths and therefore act as ingress and egress network devices that perform this inspection prior to admitting data units to and removing data units from paths, transit network devices, such as router 12B, may forgo the inspection and instead forward data units based on the labels regardless of the protocol to which each packet corresponds. As a result, transit network devices, such as router 12B, may more efficiently forward data units, as router 12B may forward data units based on labels without having to perform additional inspection of data units.

Second, as a result of the efficient forwarding described above, transit MPLS network devices, such as router 12B, may be more cost efficient. That is, router 12B may not require additional hardware and/or software to perform the packet inspection and therefore may not require the additional cost associated with implementing this logic. Third, MPLS networks, such as network 14 may transmit any type of data unit or network traffic that corresponds to a number of different protocols, including IP, an Ethernet protocol, and an ATM protocol. In this respect, MPLS may not require any protocol-specific hardware architecture in the core of the network and may be considered protocol independent. Thus, service providers may employ MPLS network 14 to service a wide variety of customers that implement a wide variety of network architectures to form customer networks, such as customer networks 16.

In accordance with the techniques described in this disclosure, one or more of routers 12 may dynamically and automatically generate and maintain a filter to facilitate application of one or more services to a plurality of packets identified by the filter. The services may include security services, such as a Network Address Translation (NAT), a firewall service, and an anti-virus service, as well as, other services that involve counting packets, time stamping packets, sampling packets, performing accounting actions, dropping a packet, policing a packet flow, performing a more detailed look-up on a packet, taking distinct Class of Service (CoS) or Quality of Service (QoS) actions, aggregating packet flows, targeted ad-insertion, Bayesian analysis on encrypted or other packets, and the like. Each of the one or more of routers 12 that implement the techniques may comprise a service plane that applies one or more, if not all, of the available services.

While described with respect to a general purpose service plane, in some instances, routers 12 may comprise a security plane that applies only the security services. The techniques may apply to a security plane in the same manner as described herein with respect to the more general service plane. In the instance of the more specific security plane, often the security plane implements many of the same security services implemented by a network security device referred to as a "firewall." In this instance, the techniques may enable a router or other network device that applies security services, such as those applied by a stand-alone firewall, to apply those security services based only on the header of an MPLS packet, e.g., a packet having an MPLS header that defines a label stack including one or more labels, rather than a header of the payload of the MPLS packet.

In other words, the payload of the MPLS packet includes the original data unit received from a customer network, such as an IP packet, Ethernet Frame or ATM cell, wherein the original data unit also includes a header, such as an IP header. The techniques may enable the router or other network device to apply the services based on the MPLS header of the MPLS packet rather than the header of the data unit encapsulated by the MPLS header. The techniques may therefore enable application of services, both security and other services, to MPLS rather than a payload or original data unit encapsulated by the MPLS packet. As a result, the techniques may enable a router to act as a pure "MPLS firewall" or "MPLS service device" that identifies packets to which to apply services based purely on the labels of the MPLS packet rather than on a header of the original data unit encapsulated by the MPLS header or MPLS payload. In some embodiments, the techniques may enable a router to act as a quasi-MPLS firewall or service device in that the router identifies packets to which to apply services based on the labels of the MPLS packet in addition to the header of the original data unit encapsulated by the MPLS header or MPLS payload.

Those of routers 12 that implement the techniques automatically generate the filter such that, logically, the filter associates a handle, which identifies a property common to the plurality of packets of a particular context, to one or more actions. Exemplary properties may include a Label Switched Path (LSP) name, a Forwarding Equivalence Class (FEC) identifier or ID, a Virtual Private Large Area Network (LAN) Service (VPLS) site identifier or ID, a Layer Two (2) Virtual Private Network (L2VPN) site identifier or ID, a Layer three (3) VPN (L3VPN) routing instance name together with the VPN prefix, a Circuit Cross-Connect (CCC) identifier or ID, or any other identifier or characteristic common to one or more packets of a particular context. The one or more actions may indicate that one or more of the above services are to be applied to the identified plurality of packets having the common property.

Initially, when configuring or editing a configuration of one of routers 12, an administrator or other user, either directly by interacting with a user interface presented by the one or router 12, such as router 12B, or indirectly by interacting with a provisioning system which then interacts with the user interface presented by router 12B, may input configuration information selecting the handle and the one or more services to apply to the plurality of packets having the common property defined by the handle. To assist the administrator, router 12B may, for example, present an automatically-generated set of recommended handles and an automatically-generated set of available services via at least one user interface to the administrator and the administrator may select one or more of the handles and one or more of the services. Router 12B may receive these selections as configuration information.

After receiving this configuration information, router 12B may parse or otherwise determine the handle from the configuration information. Router 12B may then determine an association between the selected handle that identifies a property common to a plurality of packets and one or more labels associated with the plurality of packets having the common property. Router 12B may derive this association from the property defined by the handle. In this respect, the handle, by defining the property, may represent a hint about the characteristics of a forwarding path, e.g., LSP or endpoint, of the plurality of packets that the administrator requires router 12B to filter and successively service. Router 12B, by virtue of the swap of labels to resolve the separate and distinct label spaces maintained by each of routers 12 (which may also be characterized as the negotiation of labels in coordination with its neighbors or peers), may learn of binding between these handles and the actual label values.

Based on these bindings, router 12B may construct an actual filter that performs filtering based on labels rather than handles to implement the logical filter described above. In other words, as an MPLS packet includes relatively little context by which to interpret a label, especially when compared to other protocol headers such as IP headers, router 12B performs an intermediate step to transform the handle into labels. The handle provides more context in which to understand the filter and therefore represents a more user-usable,— understandable, and/or—friendly identifier on which to filter. Router 12B then automatically generates a filter that identifies the one or more labels associated with the handle and that specifies, as an action, that the one or more services selected by the administrator are to be applied to the plurality of packets identified by the one or more labels. In this way, router 12B may filter on the MPLS packet rather than the encapsulated payload of the MPLS packet, e.g., an IP packet, ATM cell, or Ethernet Frame.

Router 12B may further continually update the generated filter to account for any changes to network 14. In some instances, network 14 may "flap" in that a number of changes may propagate across network 14 in a manner similar to the rise and fall of various portions of a flapping sheet of paper or cloth. For example, one of routers 12 may go down, malfunction or otherwise stop working, disrupting communication along any paths through the malfunctioning one of routers 12. The remaining active ones of routers 12 may learn of the malfunction and then negotiate new paths around the malfunctioning one of routers 12 in a sort of back and forth manner. Each of the active ones of routers 12 may update their respective label spaces to account for the new paths around the malfunctioning one of routers 12. The entire process surrounding this re-negotiation may resemble a flap in network 14. To account for the dynamic nature of label assignment, generally, and network flaps, as one particular example, router 12B may automatically maintain the association between the selected handle and the one or more labels by updating this association to reflect any changes to the one or more labels resulting from the flap.

After updating the association, router 12B may once again automatically generate the filter to include the one or more labels, which may be referred to herein as "filter labels."

The filter may represent a data structure or other programmable entity that filters network traffic based on the one or more filter labels to identify the plurality of packets having the common property defined by the handle. A "filter" as used herein should not be construed strictly to represent a data structure that identifies criteria by which to drop one or more packets that satisfy the identified criteria. Instead, "filter" is used herein to represent a data structure or other programmable entity that identifies criteria by which to identify one or more packets and specifies actions to take with respect to the one or more identified packets. To distinguish this form of filter from filters used strictly to drop packets, the disclosure may refer to "label filters" that represent a filter that specifies one or more labels as criteria by which to identify one or more packets and specifies actions to take with respect to the one or more identified packets.

In some embodiments, router 12B may comprise a routing plane, a forwarding plane and a service plane, as described below in more detail. The routing plane may maintain the association between the handle and the one or more labels and automatically generate and maintain the filter or label filter, in the manner described above. The routing plane may further install the filter in the forwarding plane, where maintaining the filter may involve not only updating the filter labels to account for changes to the label space maintained by router 12B but also re-installing the filter in the forwarding plane after updating the filter. The forwarding plane of router 12B may then apply the installed filter to each incoming packet of the network traffic.

As the automatically generated and installed filter identifies one or more filter labels by which to identify the plurality of packets, the forwarding plane applies the filter by determining whether the filter labels match any labels appended to each of the incoming packets, which may be referred to as "packet labels," of the network traffic. In other words, router 12B applies the automatically generated filter to an incoming packet of the network traffic that includes at least one packet label to determine whether the packet label matches any of the one or more filter labels. Router 12B may therefore filter on the MPLS header rather than payload header. As only data units admitted to an LSP may include labels and router 12B filters only those packets having a label, router 12B may therefore filter packets only after those packets have been admitted to an LSP, and such filtering should not be confused with filtering of data units to admit data units to an LSP.

For example, router 12A may receive a data unit, such as an IP packet, from customer network 16A. Router 12A may inspect the IP packet and more particularly, the IP header of the IP packet in order to determine a FEC associated with the IP packet. Based on the FEC determined for the IP packet, router 12A may encapsulate the IP packet within an MPLS header, thereby forming an MPLS packet. The MPLS header may include a label stack and router 12A may push a label onto the label stack associated with the determined FEC. Based on the label, router 12A may forward the MPLS packet via network 14 to the intended destination of the IP packet determined during the inspection of the IP packet.

Assuming, router 12A forwards the MPLS packet via path 18, router 12B receives the packet via link 20A. In particular, the forwarding plane of router 12B may receive the packet and apply the filter, or better stated, label filter (which may also be referred to as an "MPLS filter") to the MPLS packet. The forwarding plane of transit router 12B may filter based only on the packet labels included within the label stack defined by the MPLS header of the MPLS packet and not on any portion of the payload, including the IP header of the IP packet. The forwarding plane may determine, based on the application of the filter, if the filter labels match any of the packet labels included within the label stack. If none of the filter labels match any of the packet labels, router 12A may swap the top-most label of the label stack and forward the MPLS packet via link 20B to router 12C, which proceeds to pop the top-most label (and, in this instance un-encapsulate or remove the MPLS header) from the IP packet and forward the IP packet to its intended destination.

If, however, one of the filter labels matches any one of the packet labels, the forwarding plane of transit router 12B may perform the one or more actions specified by the filter. The actions, in this instance, may cause the forwarding plane to forward the incoming packet to the service plane so that the one or more services selected by the administrator can be applied to the incoming packet. The forwarding plane may then forward the incoming packet, as well as, an indication of the services to apply to the incoming packet to the service plane. The service plane, upon receiving the incoming packet, applies the one or more services to the incoming packet. Based on the application of the services, the service plane may forward the packet back to the forwarding plane, which may then proceed to route the incoming packet along path 18, as described above.

In this manner, a transit router that typically only implements MPLS protocols in the forwarding plane, such as router 12B, may apply a filter and, more specifically, a label filter by which to filter on an MPLS header rather than a header included within the payload of the MPLS packet. As a result, the forwarding plane of transit router 12B may not need to implement any other protocols in order to identify packets to which router 12B is configured to apply services. In this respect, router 12B may implement the techniques to perform pure MPLS filtering, and thereby preserve the transit or multi-protocol nature of transit devices and intent of MPLS.

Moreover, transit router 12B may enable an administrator to more easily define these filters that enable application of services to particular MPLS packets in that the administrator may configure the filters using a more static and user-friendly handle rather than a non-descript and, possibly highly dynamic, label identifier. In this sense, transit router 12B enables the administrator to define a logical filter, which transit router 12B then transforms into the actual label filter in which the handle of the logical filter is replaced by a dynamically and automatically maintained set of one or more labels. This automatic maintenance of filters may not only ease administrative burdens but may further improve the accuracy with which filters are applied, as transit router 12B may update filters in a more timely and accurate fashion when compared to manual maintenance.

While described herein with respect to applying filters to MPLS packets in order to identify to which of the MPLS packet to apply services, the techniques may enable and/or facilitate certain applications within the MPLS context. As described below with respect to FIG. 6, for example, the techniques may enable filtering in a carrier-of-carriers environment. The techniques described herein may also, as another example, enable a provider router (P-router) to filter on MPLS labels in the context of an MPLS Virtual Private Network (MPLS-VPN) cloud. In other instances, the techniques may enable, as yet another example, a router to filter in order to provide a form of MPLS security (MPLS-SEC), which may be similar to IP-SEC.

The techniques may also facilitate separation of the service plane from the forwarding plane when implemented in a router. That is, the techniques may enable the forwarding plane to filter solely on the MPLS labels and then forward the MPLS packet, e.g., either the entire MPLS packet or a portion thereof (such as just the payload of the MPLS packet), to the service plane. As the forwarding plane is typically implemented as a hardware component, such as an Application Specific Integrated Circuit (ASIC) and therefore not very updatable, the techniques, by filtering on standard MPLS labels, may reduce the need to update the forwarding plane but still provide potentially powering MPLS label filtering. The service plane, however is commonly implemented as a software or other more updateable module, as services change quickly and may require frequent updates. By enabling this separation, the techniques may provide for filtering in the forwarding plane that is not only highly efficient, but that removes filtering from the caprices of the application signature, as filtering depends only on MPLS labels.

That is, the services plane thus, often has to know about the intricacies of the payload. But services are often an added luxury, coming at a premium and it may not be possible to apply services to all transit packets. The forwarding plane, therefore, has to quickly determine whether a packet needs service and the techniques may facilitate this speed by enabling filtering through inspection of less state, or less involved state (namely the 'envelope' of the payload or the MPLS encapsulation) not the payload itself. Further, new applications and application protocols typically appear and change at a much faster rate than the MPLS mechanisms and the techniques may enable filtering and steering for services without specific regard to the caprices of the application signature, so that the forwarding plane mechanisms (ASICS etc.) do not have to be updated at quickly as the services plane mechanisms (typically, software on a processor).

Figure 2:
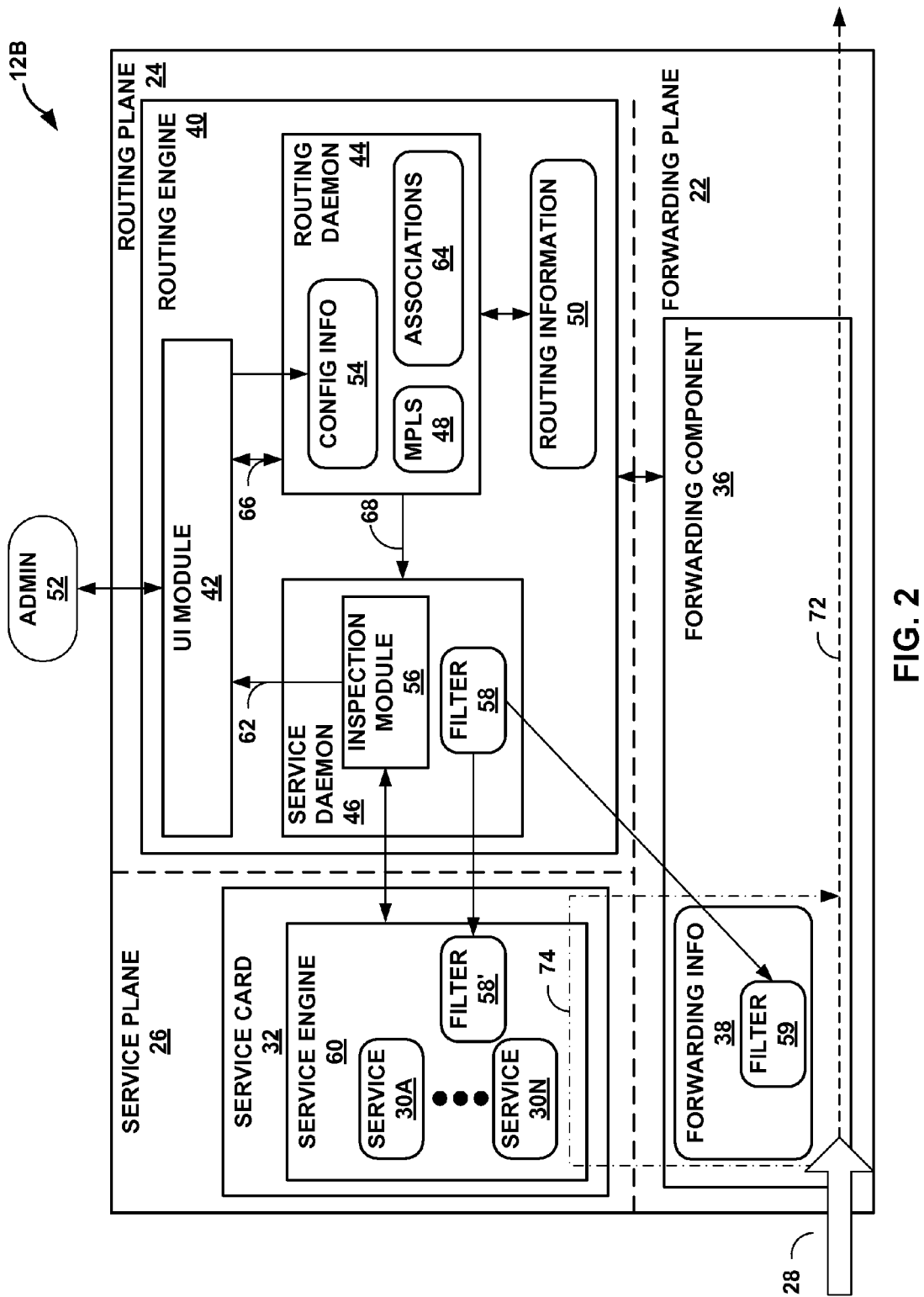
FIG. 2 is a block diagram illustrating an example embodiment of the router of FIG. 1 that performs the techniques described in this disclosure.

FIG. 2 is a block diagram illustrating an example embodiment of router 12B of FIG. 1 that performs the techniques described in this disclosure. While described with respect to transit router 12B, the techniques may be implemented by any network devices, including routers 12A and 12C, to apply services based on MPLS headers rather than payload or original data unit headers.

Router 12B may include a forwarding plane 22, a routing plane 24 and a service plane 26. Router 12B may provide forwarding plane 22 for forwarding network traffic 28 and routing plane 24 for routing network traffic 28. In some instances, forwarding plane 22 may be distributed over a plurality of interfaces or interface cards in a multi-chassis router. In other instances, forwarding plane 26 may be located in a central location, such as a programmable processor or other control unit of router 12B. Typically, routing plane 24 resides in this central location, and in instances where forwarding plane 22 resides in the central location, the same programmable processor or other control unit may include or execute both forwarding plane 22 and routing plane 24. Routing plane 24 may, in some embodiments, be distributed over a plurality of processors or components. Router 12B may further provide service plane 26 for applying one or more of a plurality of services 30A-30N ("services 30") to network traffic 28. Service plane 26 may implement the functionality of a network security device as well as other service oriented devices as at least one service card 32.

Forwarding plane 22 may include a forwarding component 36. Forwarding component 36 may represent a software and/or hardware component, such as one or more interface cards (not shown in FIG. 2), that forwards network traffic 28. Forwarding component 28 may represent a central or distributed forwarding engine, where a distributed forwarding engine is distributed across a plurality of interface cards and a central forwarding engine resides in the above described central location, e.g., control unit, of router 12B. Forwarding component 36 may forward network traffic 28 in accordance with forwarding information 38 ("forwarding info 38"). Forwarding information 38 may comprise an association or table of mappings identifying an interface by which to forward a particular packet or data unit of traffic 28. Forwarding information 38 may further comprise MPLS forwarding information that indicates an action to take with respect to a particular label appended to packets of network traffic 28.

Routing plane 24 may include a routing engine 40 that resolves routes through network 14 in accordance with one or more of a plurality of routing protocols. Routing engine 40 may include a User Interface (UI) module 42 ("UI module 42"), a routing daemon 44, and a service daemon 46. Routing engine 40 is primarily responsible for maintaining routing information 50 to reflect a current topology of network 14.

UI module 42 may represent a software and/or hardware module that presents at least one user interface with which an administrator, such as administrator 52 ("admin 52"), may interact to define configuration information 54 ("config info 54"). Configuration information 54 may represent information that indicates a selection of one or more of a plurality of handles and one or more of a plurality of services 30. Routing daemon 44 may represent a software module that updates routing information 50 to reflect a current topology of network 14. Routing daemon 44 may further maintain associations 64 between handles and labels. While described as a daemon or software module executed by routing engine 40, routing daemon 44 may be implemented as a hardware module or a combination of both hardware and software.

Routing daemon 44 may further include a Multi-Protocol Label Switching (MPLS) protocol module 48 ("MPLS 48"). MPLS 48 may comprise a hardware and/or software module that implements the various protocols of MPLS, such as the above described signaling protocol referred to as LDP, which routing daemon 44 may utilize to establish one or more paths, such as path 18, through network 14. MPLS 48 may generally represent any module that implements a protocol capable of establishing a path through a network and, while described with respect to MPLS signaling protocols, the techniques should not be limited to this exemplary protocol. Routing daemon 44 may, by way of MPLS 48, learn of one or more associations between handles and particular labels associated with one or more LSPs, such as path 18, and update associations 64, as described in more detail below.

Service daemon 46 may represent a software module that routing engine 40 executes to facilitate communication with service plane 26. Service daemon 46 may include an inspection module 56 that generally inspects service plane 26 and, more particularly, at least one service card 32 to determine services 30 supported by security card 32. Service daemon 46 may also generate and maintain at least one filter 58 in accordance with the techniques set forth in this disclosure. While described as a daemon or software module executed by routing engine 40, service daemon 46 may be implemented as a hardware module or a combination of both hardware and software.

Service plane 48, as described above, may include one or more security cards, such as security card 32. Service card 32 may represent a card inserted into a multi-chassis router, where router 12B may include a multi-chassis router. Service card 32 may include a service engine 60 that applies one or more of services 30 to network traffic 28. Inspection module 56 may therefore inspect service engine 60 to determine one or more services 30 applied by service engine 60.

Initially, admin 52 may interact with UI module 42 to enter configuration information 54. For example, UI module 42 may present one or more user interfaces that display a plurality of handles and a plurality of services. UI module 42 may build or otherwise configure these user interfaces based on information received from service daemon 46 and routing daemon 44. UI module 42 may request from service daemon 46 any services supported by service plane 26. Inspection module 56 of service daemon 46 may then inspect service card 32 to determine those services 30 supported by service engine 60. Inspection module 56 may then pass these data identifying these available services 30 to UI module 42 as a plurality of services 62.

UI module 42 may determine the plurality of handles by requesting the plurality of handles from routing daemon 44. Routing daemon 44 may maintain associations 64 between each of one or more handles and one or more labels. Routing daemon 44 may implicitly know of associations 64 or, in other words, of bindings between these handles and the labels. For example, routing daemon 44 may, in some instances, be configured to support particular services, such as VPLS, and determine from the configuration of this service the handle. With respect to VPLS, the configuration of VPLS may indicate a VPLS site ID and identify the site ID by an IP address or prefix. Based on this IP address or prefix, routing daemon 44 may determine labels maintained by MPLS 48 for LSP or paths utilized by VPLS for the particular VPLS site ID. In this respect, routing daemon 44 may determine one of associations 64 between a VPLS site ID handle and one or more labels associated with LSPs or paths directed to or coming from a particular VPLS site, as identified by an IP address or prefix. Routing daemon 44 may parse associations 64 to determine VPLS site IDs and forward these VPLS site IDs as one or more of the plurality of handles 66 to UI module 42.

With respect to another class of handles, such as an Label Distribution Protocol (LDP) Forwarding Equivalence Class (FEC) identifiers (IDs), routing daemon 44 may perform techniques similar to those described in U.S. patent application Ser. No. 11/192,747, titled "Filtering Traffic Based on Associated Forwarding Equivalence Classes," filed Jul. 29, 2005, by inventor Ina Minei, herein incorporated in its entirety by reference. Routing daemon 44 may in this instance determine the FEC IDs from MPLS 48. In this instance, MPLS 48 may implement LDP, which maintains an association between FECs, as identified by corresponding FEC IDs, and LSPs set up across the network. Routing daemon 44 may include as one or more of associations 64 as an association between FEC IDs and labels associated with LSPs corresponding to the FEC. Again, routing daemon 44 may parse associations 64 to determine one or more FEC IDs and pass these FEC IDs to UI module 42 as one or more of plurality of handles 66.

Similarly, routing daemon 44 may maintain one or more of associations 64 for other classes of handles, including L2 VPN site IDs, RSVP LSP name, VPN-prefix, CCC connection ID and the like, and parse associations 64 to determine one or more handles. Routing daemon 44 may then forward each of the handles to UI module 42 as plurality of handles 66. While described with respect to parsing associations 64, these associations 64 may abstractly represent associations that may be maintained by a plurality of other modules or that may be determined dynamically or "on-the-fly" in response to an inquiry by UI module 42. Thus, while represented in FIG. 2 as a set of associations 64 for ease of illustration purposes, these associations 64 may not be physically located in a set location or portion of memory and maintained contiguously by routing daemon 44. Instead, routing daemon 44 may, in some instances, determine these associations 64 dynamically based on a wide variety of information maintained by a number of other modules, elements, units or engines.

UI module 42 may, in response to these services 62 and handles 66, construct, build, update or otherwise maintain one or more user interfaces to present both the plurality of services 62 and the plurality of handles 66. Admin 52 may then select one or more of the plurality of handles 66 and one or more of the plurality of services 62 presented by the one or more user interfaces, which UI module 42 may receive as configuration information 54. Configuration information 54 may, as described above, define a logical filter that associates the selected one or more handles with the selected one or more services. UI module 42 may forward this configuration information 54 to routing daemon 44, which proceeds to transform the logical filter into an actual filter 58 by which router 12B may determine a plurality of packets to which the selected one or more of services 30 are to be applied.

Routing daemon 44 may transform the logical filter indicated by configuration information 54 to filter 58 by replacing the selected one or more handles with one or more corresponding MPLS labels identified by associations 64. Routing daemon 44 may, for example, receive a VPLS site ID handle, access associations 64 using the VPLS site ID as a key, and determine one or more labels associated with the VPLS site ID. Routing daemon 44 may then replace the VPLS site ID handle of configuration information 54 with the one or more labels associated with VPLS site ID in associations 64. Routing daemon 44 may proceed to replace each of the handles identified by configuration information 64 with one or more labels associated with each of the handles in associations 64. Routing daemon 44 may then forward this modified version of configuration information 54, e.g., a version of configuration information 54 where the handles are replaces with corresponding labels, to service daemon 46 as transformed configuration information 68.

Service daemon 46 may receive transformed configuration information 68 and generate filter 58. Filter 58 may include a from field that includes each of the labels specified by transformed configuration information 68 and an action field that includes each of the serviced specified by transformed configuration information 68. Service daemon 46 may then proceed to install filter 58 into forwarding plane 22 and, particularly, forwarding component 36. When installed into forwarding component 36, this filter may be referred to as a forwarding-plane filter, which is shown in FIG. 2 as filter 59. Although shown as installed within forwarding info 38, forwarding-plane filter 59 may be installed generally within forwarding component 36.

In some instances, as shown in the example of FIG. 2, service daemon 46 installs filter 58 within forwarding information 38. That is, service daemon 46 associate filter 58 with one or more entries in forwarding information 38, thereby installing filter 58 as forwarding-plane filter 59. Forwarding information 38 may include an entry for each label and, within each entry, an action to take with respect to the corresponding label as well as an interface by which to forward the MPLS packet having the corresponding label. Service daemon 46 may update the entry with filter 59 by specifying that the one or more actions defined by filter 59 occur prior to forwarding the MPLS packet of network traffic 28 from router 12B along a given path or LSP identified by one or more labels of the MPSL packet. In this instance, service daemon 46 may update those entries with an action specifying that forwarding component 36 forward packets having the corresponding label to service card 32 for application of the one or more serviced identified by filter 59.

Thus, forwarding component 36 may receive network traffic 28 and for each MPLS packet of network traffic 28 perform a lookup within forwarding information 38 based on the top-most label in the label stack defined by the MPLS header of the MPLS packet. Forwarding component 36 may look-up one of the above described entries and perform the action specified with respect to the entry. If none of the packet labels match any of the filter labels, e.g., the labels identified by filter 59, the entry therefore would not have been updated by service daemon 46 with any actions requiring forwarding component 36 to forward this packet to service card 32. As a result, forwarding component 36 may perform the label action identified by the entry determined from the look-up, e.g., a label swap, a label pop, a label push, and forwards the MPLS packet as outgoing network traffic 72 along an LSP, such as path 18, associated with the label.

However, if one or more of the packet labels match one or more of the filter labels, the entry retrieved from the lookup may specify an action, whereby forwarding component 36 may forward the incoming MPLS packet of network traffic 28 to service card 32 for application of the one or more of services 30. Forwarding component 36 may then forward this incoming MPLS packet as service traffic 74 to service card 32 with, in some embodiments, an indication of which of services 30 to apply to the incoming MPSL packet. Forwarding component 36 may also forward with service traffic 74 a context in which to apply the indicated one or more of services 30. That is, service plane 26 may require a context by which to index security or service policies (not shown in FIG. 2) maintained by service plane 26, as service plane 26 may apply services 30 differently for distinct forwarding domains, as one example. Forwarding component 36 may provide the context in which service plane 26 needs to operate for that packet (and by extension, for that flow) by, as an example, providing a VPN label, the incoming interface, the outgoing interface or any combination thereof.

Forwarding component 36 may also provide the result of a route lookup in forwarding information 38 identifying the egress interface that the MPLS packet will take. The egress interface may be identified by a FEC to which the incoming MPLS packet is associated. Service plane 26 may require this additional egress interface information to determine an appropriate services/security zone, which may facilitate the application of the one or more identified services. This additional information may be referred to herein as a "service context" and may include both the above described context and the egress interface, e.g., FEC, associated with the incoming MPLS packet. Forwarding component 36 may provide the additional information be pre-pending or appending context information to each packet or group of packets directed to service card 32. In one embodiment, forwarding component 36 appends a list of identifiers to the packet for each filter installed within the forwarding plane that matches the MPLS label(s) of the packet.

Service engine 60 may then appropriately apply, given this additional service context provided by forwarding component 36, the indicated ones of services 30 to the incoming MPLS packet before forwarding the incoming MPLS packet back to the forwarding component. For example, in some embodiments, service engine 60 may, rather than receive an indication from forwarding component 36 of which the one or more services 30 to apply, access filter information 58' installed by service daemon 46 of routing engine 40 to compare the additional context information provided by forwarding plane 36 (e.g., the context information) to any handles defined within filters 58. This allows service engine 60 to resolve the context information to the user-defined handles in real-time, i.e., when receiving transit packets from forwarding plane 22, which in turn allows the service engine 60 to select particular services provided by the service plane 26 in a manner that is independent of the particular MPLS labels that may be contained within any MPLS label stack of the packets. In this way, service plane 26 can selectively apply services 30 to the transit MPLS packets based on user-defined filter 58 and the user-defined handles without reference to specific MPLS labels.

Service engine 60 typically applies the indicated ones of services 30, not to the entire MPLS packet, but to the payload of the MPLS packet, e.g., the original data unit received by router 12A at the ingress of path 18. Forwarding component 36 may forward, as part of the service context, an offset indicating the start of the payload within the MPLS packet. In other instances, forwarding component 36 may only forward the payload of the MPLS packet to service engine 60. In these instances, forwarding component 36 may still forward the MPLS packet insomuch that the payload comprises a portion of the MPLS packet. In some instances, based on the ones of services 30 applied, such as an anti-virus service, service engine 60 may not forward the incoming MPLS packet back to forwarding component 36, as the incoming MPLS packet may be detained, quarantined or dropped, especially if determined to be a security threat. Thus, while shown as returning to forwarding component 36, some, a portion of, or all of service traffic 74 may not necessarily return to forwarding component 36.

Assuming, however for purposes of illustration, that service engine 60 forwards the incoming MPLS packet back to forwarding component 36, forwarding component 36 accesses forwarding information 38 once again to determine a label action to take with respect to the incoming MPLS packet. Forwarding component 38 may once again look-up the entry associated with the top-most label of the incoming MPLS packet and performs the label action specified in the determined entry. After performing the label action, forwarding component 38 may forward the incoming MPLS packet according to its current label as outgoing network traffic 72 along an LSP associated with the top-most label.

In this manner, admin 52 may more easily define a logical filter using user-friendly handles, which routing daemon 44 and service daemon 46 may automatically transform into a filter that filters purely on MPLS labels rather than payload data header information, such as filter 58. Service daemon 46 may then automatically install filter 58 within forwarding component 36 in the manner described above such that incoming MPLS packets of network traffic 28 may be filtered based on packet labels included within the incoming MPLS packets. This filtering may identify those of incoming MPLS packets that forwarding component 36 forwards to service engine 60 for application of one or more of serviced 30, where those applied services are identified by admin 52. As a result, the techniques may facilitate application of services to MPLS packets.

Forwarding component 36 may also receive as a portion of network traffic 28, advertisements that advertise changes to labels used by neighboring LSRs, such as routers 12A, 12C. Forwarding component 36 may forward these advertisements to rouging engine 40, where MPLS 48 of routing daemon 44 may update routing information 50. When updating routing information 50, routing daemon 44 may also (implicitly) update associations 66. Routing daemon 44 may maintain configuration information 54 for each of filters 58 and automatically, e.g., without prompting from admin 52, determine whether updates to associations 64 impact any of the logical filters defined by configuration information 54. That is, routing daemon 44 may determine whether changes to associations 64 between each of the plurality of handles and one or more labels impacts any handles identified by the logical filter defined by configuration information 54.

As associations 64 may not necessarily comprise a set of associations actively maintained by routing daemon 44 but a set of associations that can be derived at any point in time based on information from a plurality of sources, e.g., modules, units, etc., routing daemon 44 may determine pertinent associations 64 for those handles identified by configuration information 54. Routing daemon 44 may then, once again, transform those handles within configuration information 54 to replace those handles with the updated labels. Routing daemon 44 may, in some instances, perform this repeat transform in response to any label changes or may, first determine whether any of the handles identified by configuration information 54 are impacted, and only repeat the transformation for those handles that are determined to be impacted by the label advertisements.

Regardless of how routing daemon 44 updates configuration information 54, routing daemon 44 may then forward transformed configuration information 68 to service daemon 46 which proceeds to regenerate filter 58 based on transformed configuration information 68 and install filter 58 within forwarding component 36. In this way, router 12B may automatically, e.g., without prompting or any intervention by admin 52, update filter 58 to account for any current or dynamic changes or flapping of labels within network 14. Router 12B may therefore dynamically and automatically maintain associations 64 and filter 58 derived from associations 64. Again, router 12B, by virtue of this automatic maintenance, may promote more accurate filtering and reduce administrative burdens associated with maintaining filters, such as filter 58.

Moreover, the techniques by enabling this form of MPLS filtering or filtering based only on labels rather than other state information not included within an MPLS header may improve the efficiency with which router 12B may determine whether to apply one or more of services 30. That is, the techniques may enable forwarding plane 22 of router 12B to more quickly identify whether a packet requires servicing, as less state is inspected (e.g., only a label stack) rather than both the label stack and the payload.

Figure 3:
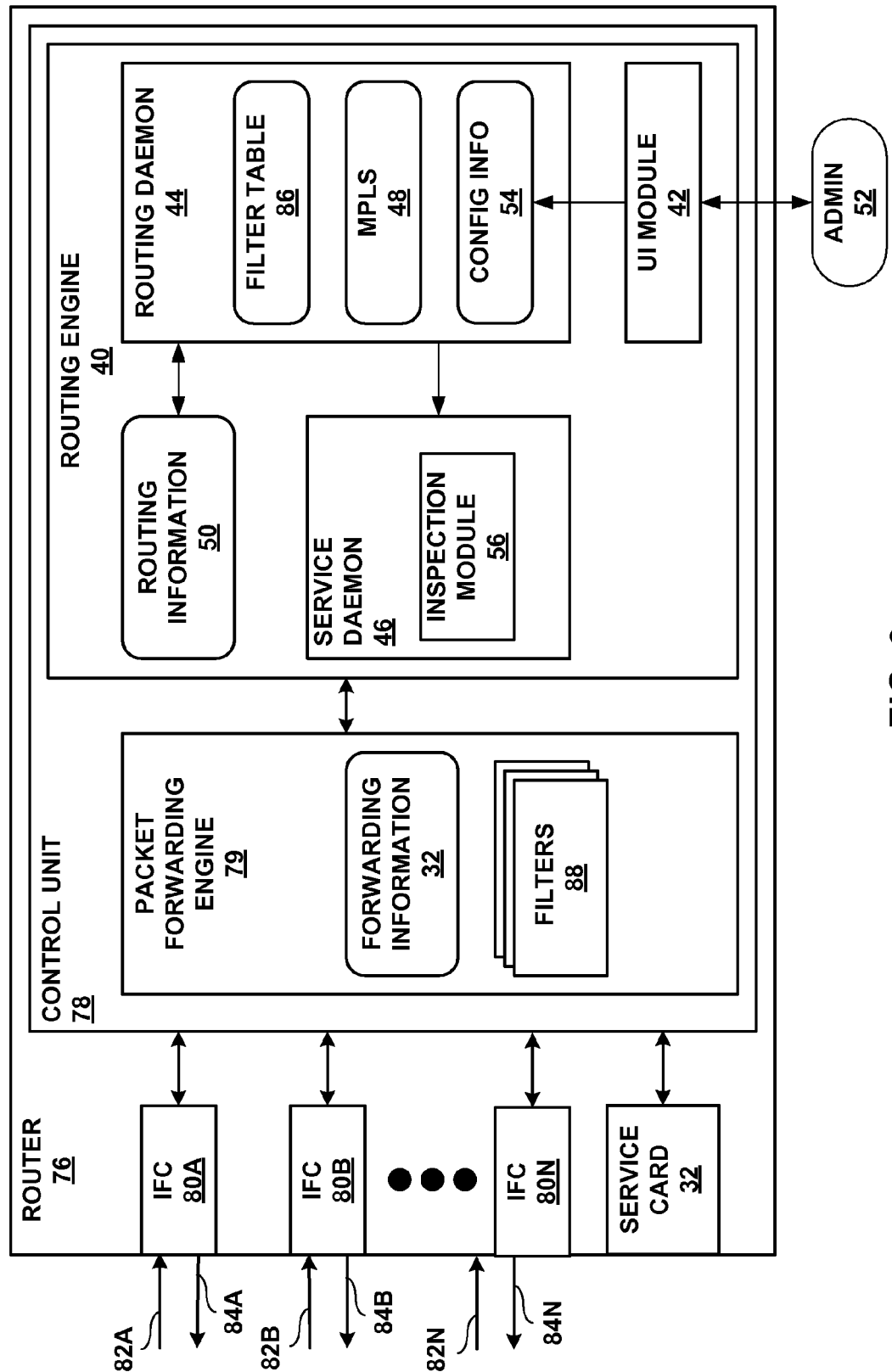
FIG. 3 is a block diagram illustrating an exemplary embodiment of a router that implements the techniques described herein.

FIG. 3 is a block diagram illustrating an exemplary embodiment of a router 76 that implements the techniques described herein. Router 76 may be substantially similar to any one of routers 12 of FIG. 1 and may represent one exemplary architecture by which to implement the techniques described with respect to router 12B of FIG. 2. In this respect, router 76 includes many of the same modules, daemons, units and other components of router 12B, such as routing engine 40, routing daemon 44 (which includes similar MPLS module 48), service daemon 46 (which includes similar inspection module 56), UI module 42 and service card 32.

Router 76 may however include modules, units, elements or components not shown in the example embodiment of router 12B as shown in FIG. 2. Router 76 may, for example, include a control unit 78 in which both of routing engine 40 and a packet forwarding engine 79 reside. In other words, control unit 78 may include both packet forwarding engine 79 and routing engine 40. Control unit 78 may comprise hardware, e.g., one or more of a programmable processor, a Field Programmable Gate Array (FPGA), an Application Specific Special Product (ASSP), an Application Specific Integrated Circuit (ASIC), an integrated circuit, etc., and a computer-readable storage medium or memory, e.g., static memory (a hard drive, an optical drive, a disk drive, FLASH memory, etc.) and/or dynamic memory (a Random Access Memory or RAM, dynamic RAM or DRAM, etc.). In some instances, the computer-readable storage medium may comprise instructions, such as those used to define a software or computer program, that cause the above listed programmable processor to perform the techniques described herein.

Packet forwarding engine 79 may comprise a portion of forwarding component 36 of FIG. 2 that maintains forwarding information 32 and filters 88. Filters 88 may each be substantially similar to filter 58 of FIG. 2. Packet forwarding engine 79 may represent a hardware and/or software module responsible for forwarding packets received from one or more of IFCs 80 and corresponding inbound links 82A-82N ("inbound links 82") via one or more of interface cards (IFCs) 80A-80N ("IFCs 80") and corresponding ones of outbound links 84A-84N ("outbound links 84"). Packet forwarding engine 79 may also forward or otherwise divert some inbound packets to service card 32 based on the application of filters 88, as described above.

Router 76 may further include the above mentioned plurality of IFCs 80 and at least one service card 32. Each of IFCs 80 may receive incoming packets, such as incoming MPLS packets, via inbound links 82 and send packets, such as outgoing MPLS packets, via outbound links 84. Each of IFCs 80 and service card 32 is typically coupled to links 82, 84 via a number of interface ports. In one embodiment, IFCs 80 and service card 32 are each inserted into a different slot of a chassis so as to electrically couple to control unit 78. Often, a switch is positioned between IFCs 80/service card 32 and control unit 78 that switches, typically at a high-speed, the coupling between IFCs 80/service card 32 and control unit 78.

As described above, initially admin 52 may enter configuration information 54 via a user interface presented by UI module 42. Routing daemon 44 may transform the logical filter defined by configuration information 54 based on associations, such as associations 64 shown in FIG. 2. In the example of FIG. 3, routing daemon 44 maintains the transformed filter in a filter table 86 thereby preserving implicit associations 64 between the handle for a particular logical filter defined by configuration information 54 and one or more labels that identify one or more MPLS packets having the common property defined by the handle. Filter table 86 may therefore represent a table or other data structure (e.g., linked list, tree, etc.) for storing logical filters and labels associated with the one or more handles of each logical filter.

Routing daemon 44 may then base the determination of those handle-to-label associations impacted by label advertisements received from other neighboring or peer LSRs on filter table 86. In other words, routing daemon 44 may scan each logical filters maintained within filter table 86 and determine which of these logical filters need to be retransformed and transmitted to service daemon 46. Whether transforming a newly input logical filter or updating an existing logical filter maintained within filter table 86, routing daemon 44 may forward the transformed configuration information to service daemon 46, which then automatically generates and installs this filter as a new one of filters 88. In the instance of updating a filter, the generated and installed updated filter may replace or otherwise update an existing one of filters 88.

Router 76 may then receive via one of IFCs 80 and inbound links 82 network traffic comprising one or more incoming MPLS packets. IFC 80 may forward the incoming MPLS packets to packet forwarding engine 79, which may apply one or more of filters 88 to the incoming MPLS packets in order to determine whether labels included within an MPLS header of each of the MPLS packets, e.g., packet labels, matches labels defined within each of the one or more of filters 88, e.g., filter labels. If a match occurs, packet forwarding engine 79 may forward the incoming MPLS packet to service card 32, which may represent the service plane, whereupon service card 32 applies the services indicated by the matching one or more of filters 88. Service card 32 may then forward the packet back to packet forwarding engine 79, which forwards the incoming MPLS packet in the manner described above. If no match occurs, packet forwarding engine 79 forwards the incoming MPLS packet in the manner described above, without first forwarding the incoming MPLS packet to service card 32.

Figure 4:
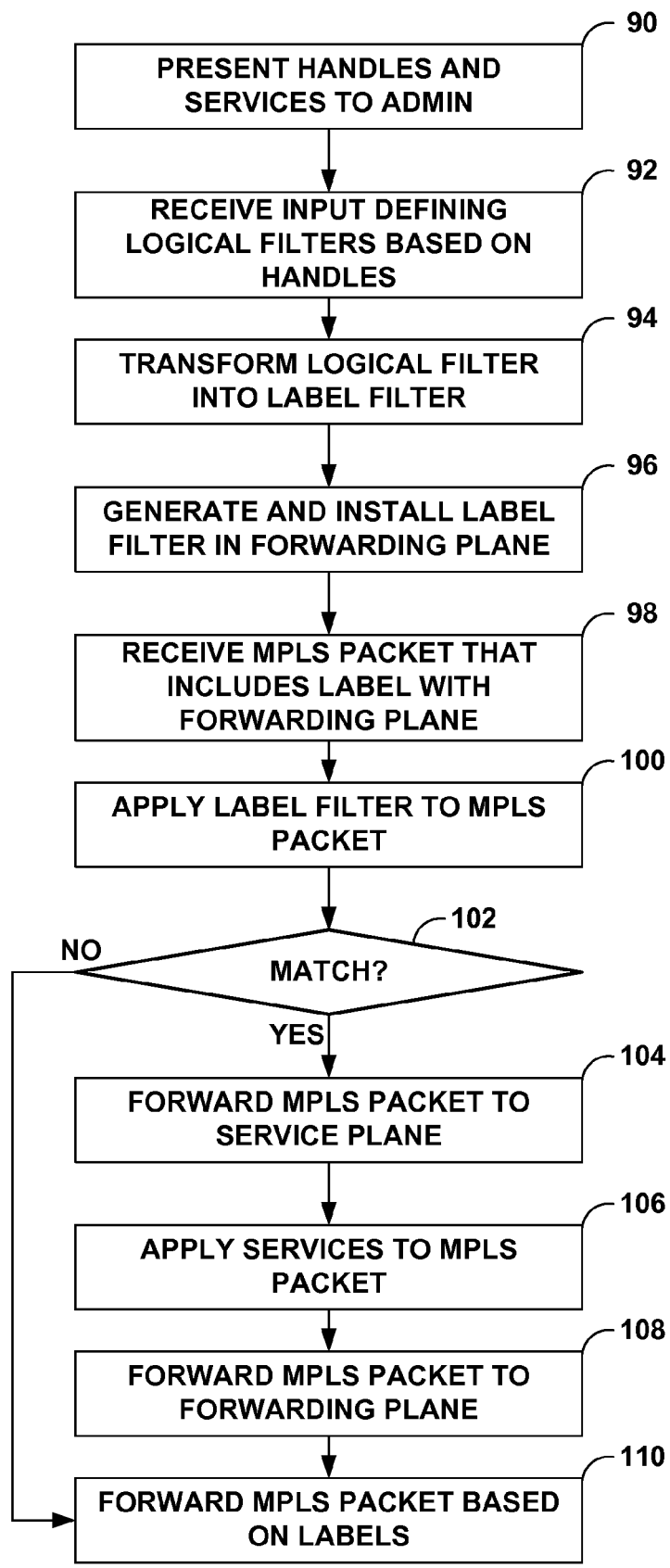
FIG. 4 is a flowchart illustrating example operation of a router in dynamically generating, installing and applying a filter to facilitate application of services according to the techniques described herein.

FIG. 4 is a flowchart illustrating example operation of a router, such as router 12B of FIG. 2, in dynamically generating, installing and applying a filter to facilitate application of services according to the techniques described herein. While described with respect to router 12B of FIG. 2, the techniques should not be so limited and may be implemented by any network device comprising any architecture, including the architecture described with respect to router 76 of FIG. 3, as well as other network devices, such as switches, hubs, or any other device capable of forwarding packets based on packet labels.

Initially, router 12B and, more specifically, UI interface 42 may present to admin 52 via a user interface the automatically-generated set of recommended handles 66 and the set of available services 62 from which to select (90). UI interface 42 may retrieve data specifying these handles 66 and services 62 by issuing queries to routing daemon 44 and service daemon 46 for recommended handles 66 and available services 62 respectively. UI interface 42 may, upon presenting the user interface, receive via the user interface input selecting one or more of handles 66 and services 62 as configuration information 54 from admin 52 (92). As one example, configuration information 54 may be conform to a textual scripting language and may define a logical filter. An exemplary logical filter may be defined according to the following textual filter template:

```
filter foo {
  from {
    <MPLS-handle>
  } then {
    <filter actions>
  }
}
```

The exemplary logical filter template is named "foo" and includes both a "from" field in which a variable "MPLS-handle" may be identified and a "then" or better stated, an action field in which one or more variable "filter actions" may be specified from the available services 62. While MPLS-handle and filter actions are not specifically represented, an MPLS handle may comprise any handle that identifies a property common to one or more packets and filter actions may comprise application of one or more services supported by service card 32.

Another more complex example of a logical filter may be defined according to the following textual filter template:

```
filter widget {
  term first {
    from {
      <any one or more of a combination of:
        [RSVP LSP-id(s),
        CCC-connection-id(s),
        L3VPN rt-inst(s)+VPN-prefix,
        etc. other handles that we speak of]>
    } then {
      <filtering actions>
    }
  }
  terms second {
    . . .
  }
}
```

As in the preceding example of the foo filter template, the widget filter template shown above provides for a "from" field and a "then" field. Notably, both the foo and widget filter templates include handles that identify or represent one or more labels in the "from" field rather than handles related to other non-MPLS related instances, such as interfaces or forwarding classes (not to be confused with FECs but instead defining a Quality of Service class). Filters defined in this manner may be more easily installed within outgoing and ingoing interfaces, as the filter may comprise an autonomous filter instance independent of any other MPLS handles that may be used to trigger conventional filters.

In other words, the filter internalizes the MPLS handle triggering event, which, in some instances, may alleviate configuration burdens on administrators, as the administrators may simply install the filter but need not also define the MPLS triggering event when installing these filters. For example, consider the following textual input or configuration information that may be entered by an administrator or other network user in order to install the widget filter in an interface fe-0/1/0:

```
interface fe-0/1/0 {
  unit 0 {
    family inet {
      [family inet gorp]
      filter {
        input bar; /* independent from filter foo */}
      }
    }
    family mpls {
      [other family mpls configuration]
      filter {
        input widget; /* MPLS filter to use for ingress packets */
        output buzz; /* MPLS filter for o/p, independent from foo */
      }
    }
  }
}
```

In the above textual configuration information, the administrator need only enter "input widget" to install the filter within the family referred to as "MPLS," rather than provide a particular MPLS handle that triggers application of the filters. As a result, administrators may find installing filters defined in accordance with the techniques described herein more intuitive, especially if in other aspects, such as a family of protocols known as IP/IPv6, the filters are installed in a similar manner. Moreover, this seemingly automatic triggering of filters may occur as a result of the automatic mapping of these handles to labels enabled by the techniques described herein.

In any event, after receiving one or more logical filters as configuration information 54, routing daemon 44 may transform the logical filter identified by configuration information 54 based on associations 64, as described above (94). For example, assuming the above filter template represented an actual logical filter, routing daemon 44 may transform this assumed logical filter into a filter 58 having the following form:

filter foo {
from {
   <MPLS-labels <label properties>>
} then {
   <filter actions>
}
}

The exemplary filter template is likewise named "foo" and includes a "from" field in which the MPLS-header is replaced with one or more corresponding "MPLS-labels" having particular "label properties." As the filter filters on labels rather than handles, this filter may be referred to as a "label filter." The exemplary filter template further includes the "then" or "action" field that includes the same "filter actions" as the logical filter template. Routing daemon 44 may forward this transformed configuration information 68 to service daemon 46, which may then generate filter 58 based on this information 68. Service daemon 46 may further transform the filter actions sections of information 68 to suit installation purposes within forwarding component 36 and perform other operations necessary to generate filter 58. Once generated, service daemon 44 may install filter 58 within forwarding component 36, as described above (96).

While described above with respect to routing daemon 44 receiving configuration information 54 from UI module 42, service daemon 44 may instead receive configuration information 54 directly from UI module 42. In this instance, service daemon 44 may parse configuration information 54 to determine the MPLS handle. Once parsed, service daemon 44 may communicate the MPLS handle to routing daemon 44 via a message that identifies a type, index and handle-properties of the parsed MPLS handle. Routing daemon 44, due to signaling with LSR peers as described above, may learn to which labels or label stacks these MPLS handles conform. Routing daemon 44 may then communicate via another message a type, index and label-properties to service daemon 46. With respect to both of these messages the type, index and properties may be used to identify a particular one or group of handles and labels, respectively. Service daemon 46 may then transform the logical filter into the actual label filter rather than routing daemon 46, and as a result the techniques should not be limited to any particular exemplary implementation.

Regardless of which daemon transforms the logical filter into the label filter, service daemon 44 installs the filter. Service daemon 44, as shown in FIG. 2, may install this filter 58 by linking filter 58 to an entry in forwarding information 38. Alternatively, service daemon 46 may install filter 58 to an incoming interface or to an egress interface. Regardless, forwarding component 36 of forwarding plane 22 may receive an MPLS packet comprising at least one label, referred to herein as packet labels and then apply installed filter 58 to the incoming MPLS packet to determine whether one or more of the packet labels match the one or more of the labels identified by the filter, which are referred to herein as filter labels (98, 100, 102).

While described herein as applying filter 58 to a received packet, the techniques should not be limited to application of filters as packets ingress the router. Instead, the techniques may enable a router or other network device to apply filters to packets as these packets egress the router. In other words, the router may apply a filter, and upon a match, may perform the filter action (including re-direction of the matched packet to the service plane) after the router takes the forwarding action and changes the MPLS label on the packet (whether a swap, push or pop). This after-forwarding filtering may be useful in instances of packet aggregation where packets with label L1, for example, may ingress the router from FEC F1 on Interface I1, while those with label L2 may ingress from FEC F2 through interface I2. In this example, both sets of packets may go through a swap action, with a label L3 being impinged upon each of these packets and these packets may egress through Interface I3. The router may, in this example, apply a filter to perform some action on both sets of packets, but rather than applying a pre-swap filter on both I1 and I2, the router may apply a post-swap or forwarding action filter on I3.

Notably, forwarding component 36 may match more than one packet label to one or more filter labels to account for instances where a single packet label cannot be understood by itself or outside the context of additional packet labels. One example may occur in instances where router 12B resides along an LSP, such as path 18, formed to accommodate multicast Virtual Private Network (VPN) services. In this instance, labels may be distributed not from downstream LSRs to upstream LSRs via a process referred to as "downstream label assignment" but from upstream LSRs to downstream LSRs via a process referred to as "upstream label assignment." In some instances, upstream label assignment involves both an outer label that is distributed via downstream label assignment and an inner label that is distributed via upstream label assignment. The inner label is referred to as "inner" in that it resides below the outer label in the MPLS label stack. Likewise, the outer label is referred to as "outer" in that it resides above the inner label. These upstream assigned labels may be associated with FEC or other handle that identifies a source device, e.g., by way of a source IP address.

To forward an MPLS packet having such an upstream assigned label, forwarding component 36 typically determines how to forward the MPLS packet based on the downstream assigned outer label given the context of the upstream assigned inner label. While upstream assigned labels may complicate forwarding, with respect to filtering, routing daemon 44 may identify both the upstream and downstream assigned labels required to resolve a particular label context and transform the handle, which in this case may, for example, comprise a VPN site ID, into two or more labels. Routing daemon 44 may even, when transforming the handle, specify that the order of the labels in the filter must match, thereby configuring the filter to match one of the filter labels to the outer label and one of the filter labels to the inner label. In this sense, routing daemon 44 may configure filter 58 to match on two or more labels, or even, a particular configuration of two or more labels in a label stack. Extending this further, router 12B may even filter on whole label stacks comprising a plurality of labels.

Thus, while described with respect to labels assigned via downstream label assignment the techniques may apply to upstream label assignment as well. More information concerning upstream label assignment with respect to the MPLS signaling protocol referred to as LDP can be found in an Internet Draft, titled "MPLS Upstream Label Assignment for LDP," authored by R. Aggarwal et al., dated Jul. 8, 2008, herein incorporated by reference in its entirety. More information concerning upstream label assignment with respect to the MPLS signaling protocol referred to as Resource Reservation Protocol with Traffic Engineering extension (RSVP-TE) can be found in an Internet Draft, titled "MPLS Upstream Label Assignment for RSVP-TE," authored by R. Aggarwal et al., dated Jul. 8, 2008, herein incorporated by reference in its entirety.

In any event, forwarding component 36 may apply installed filter 58 to the incoming MPLS packet as described above to determine whether one or more of the filter labels match the packet labels. If a match occurs ("YES" 102), forwarding component 36 takes the action specified by filter 58, which typically involves forwarding component 36 forwarding the MPLS packet to service plane 26, as described above (104). While described with respect to forwarding the MPLS packet to an internal service plane 26, the techniques may enable router 12B to forward these MPLS packets to an external services device, such as a firewall or Intrusion Detection/Prevention (IDP) device. The techniques therefore should not be limited strictly to forwarding the MPLS packet to an internal service plane 26.

Service card 32 of service plane 26 receives the MPLS packet as service traffic 74, where service engine 60 applies one or more of services 30 identified by filter 58, e.g., in the action or then field of filter 58 (106). As some of services 30 may not involve dropping, detaining or quarantining the packet, service card 32 may forward the MPLS packet back to forwarding plane 22 (108). For example, one of serviced 30 may resemble an MPLS version of an Internet Protocol SECurity (IPSEC) service, which may be referred to as MPLS-SECurity (MPLS-SEC). Applying MPLS-SEC may involve encrypting traffic in an LSP, based on characteristics that identify the MPLS session, where the MPLS session may represent all traffic carried between two devices that implement the techniques described herein. Some services 30 however may detain or otherwise drop, delete or quarantine the packet, and in these instances, service card 32 may not forward the MPLS packet back to forwarding plane 22.

Assuming however that service card 32 forwards the MPLS packet back to forwarding plane 22, forwarding component 36 of forwarding plane 22 may receive the MPLS packet and forward the MPLS packet based on the packet labels of the MPLS packet as outgoing traffic 72 in the manner described above (110). If no match arises, forwarding component 36, rather than forward the MPLS packet to service card 32, forwards the MPLS packet based on the packet labels as outgoing traffic 72, again in the manner described above ("NO" 102, 110).

Figure 5:
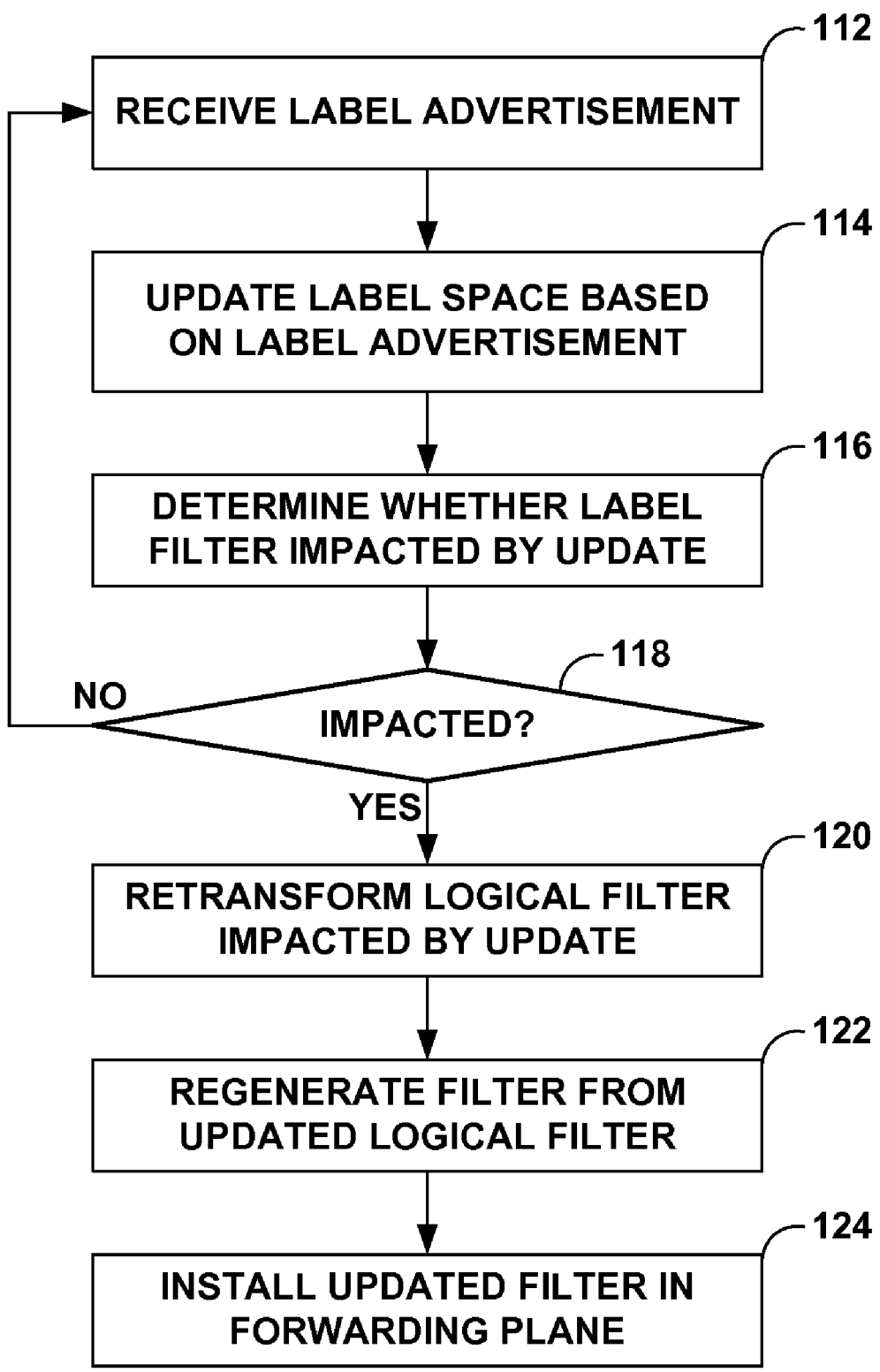
FIG. 5 is a flowchart illustrating example operation of a router in automatically maintaining one or more filters in accordance with the techniques described herein.

FIG. 5 is a flowchart illustrating example operation of a router, such as router 12B of FIG. 2, in automatically maintaining one or more filters in accordance with the techniques described herein. While described with respect to router 12B of FIG. 2, the techniques should not be so limited and may be implemented by any network device comprising any architecture, including the architecture described with respect to router 76 of FIG. 3, as well as other network devices, such as switches, hubs, or any other device capable of forwarding packets based on packet labels.

Initially, admin 52 may define one or more logical filters via configuration information 54, which router 12B may transform into label filters, such as filter 58, in the manner described above. This transformation may involve replacing a handle specified by configuration information 54 with one or more labels associated with packets having the common property identified by the handle. In this manner, router 12B may generate a true or pure MPLS filter, such as filter 58, that filters based on MPLS labels rather than on the actual common property, which may require inspection of the MPLS packet payload.

However, as time progresses, routers 12 may establish one or more paths, similar to path 18, to which labels may be assigned that impact associations between particular handles and corresponding labels. Alternatively, routers 12 may teardown or otherwise remove one or more paths, which may also impact the association between particular handles and corresponding labels. In some instances, one or routers 12 may also fail or malfunction such that one or more paths may fail and the remaining active ones routers 12 may then establish paths around the failed one of routers 12.

For example, routers 12 may establish path 18 to reach provide a VPLS to a particular VPLS site. Admin 52 may then define a logical filter by inputting configuration information 54 that identifies a VPLS site ID corresponding to the VPLS site and one or more of services 30 to apply to MPLS packets directed to the VPLS site. Router 12B may then transform the VPLS site ID handle defined by configuration information 54 to a label associated with path 18, which is used to reach the VPLS site identified by the VPLS site ID. Router 12B may then install and apply this filter to network traffic 28, such that MPLS packets of network traffic 28 that include a packet label matching the filter label are forwarded to service plane 26 of router 12B. Service card 32 of service plane 26 may then apply the one or more of services 30 identified by filter 58. Assuming no changes to path 18, router 12B may continue to apply filter 58 in this manner.

However, if one of routers 12 fails, the remaining one of routers 12 may establish a new path around the failed one of routers 12 by exchanging label advertisements. Once the failed one of routers 12 comes back on-line, e.g., returns to normal operation, routers 12 may re-establish path 18 by once again exchanging label advertisements. Router 12B may receive a label advertisement, for example, that maps different labels than previously mapped to the same path 18, e.g., as identified by a particular FEC. In this respect, network 14 has "flapped" and each label space maintained by routers 12 may have been altered in response to the flap such that one or more labels associated with path 18, e.g., a particular FEC, prior to the flap may not be assigned to the same path 18, the particular FEC, after the flap.

To ease administrative burdens, router 12B may receive label advertisements advertising a new label-to-FEC association for path 18 and update its label space based on the received label advertisement (112, 114). Router 12B and, more particularly, routing daemon 44 of router 12B may determine whether any label filters, such as filter 58, are impacted by the update to the label space (116). Routing daemon 44 may determine whether any label filters are impacted by determining whether any of associations 64 are impacted by the update. If, as in the above example, a new label is associated with path 18, one of associations 64 between the VPLS site ID handle and the corresponding one or more labels may change or be impacted by the update. Particularly, the VPLS site ID handle may be associated with a new or different label after the network flap from the label associated with the VPLS site ID handle before the network flap.

After determining that filter 58 has been impacted by the update ("YES" 118), routing daemon 44 may retransform the logical filter impacted by the update by once again transforming the handle defined by configuration information 54 to the newly updated one or more labels (120). Routing daemon 44 may then transmit transformed configuration information 68 to service daemon 46, whereupon service daemon 46 may regenerate filter 58 and install filter 58 within forwarding component 36 of forwarding plane 22, as described above (122, 124).

In some instances, service daemon 44 may install filter 58 prior to allowing any traffic to traverse a particular LSP associated with labels identified in filter 58 as requiring filtering. This requirement may be referred to as a "make-before-break" requirement when an old LSP is torn down or broken and a new LSP is established. The requirement therefore requires that the filter is made (e.g., generated and installed using the labels associated with a new LSP) before breaking or tearing down the old LSP.

In the instance described above where service daemon 46 receives configuration information 54 and informs routing daemon 44 of the handles, routine daemon 44 may maintain these handles received via the message from service daemon 46 in order to determine whether any of the handles are impacted by the label advertisement. Routing daemon 44 in this instance may access associations 64, which in this case may represent actual associations between handles and labels rather than logical associations determined on the fly from a variety of information sources, and determine if the label advertisement impacts any of the handles. Routing daemon 44 may then retransform the handle into the new set of one or more labels and report this new set of labels back to service daemon 46, which proceeds to regenerate and install the impacted filter.

If none of the label filters, such as filter 58, are impacted ("NO" 118), routing daemon 44 may wait to receive another label advertisement (112). In response to receiving another label advertisement, routing daemon 44 may proceed to perform the above process to dynamically and automatically maintain the label filters (112-124).

Figure 6:
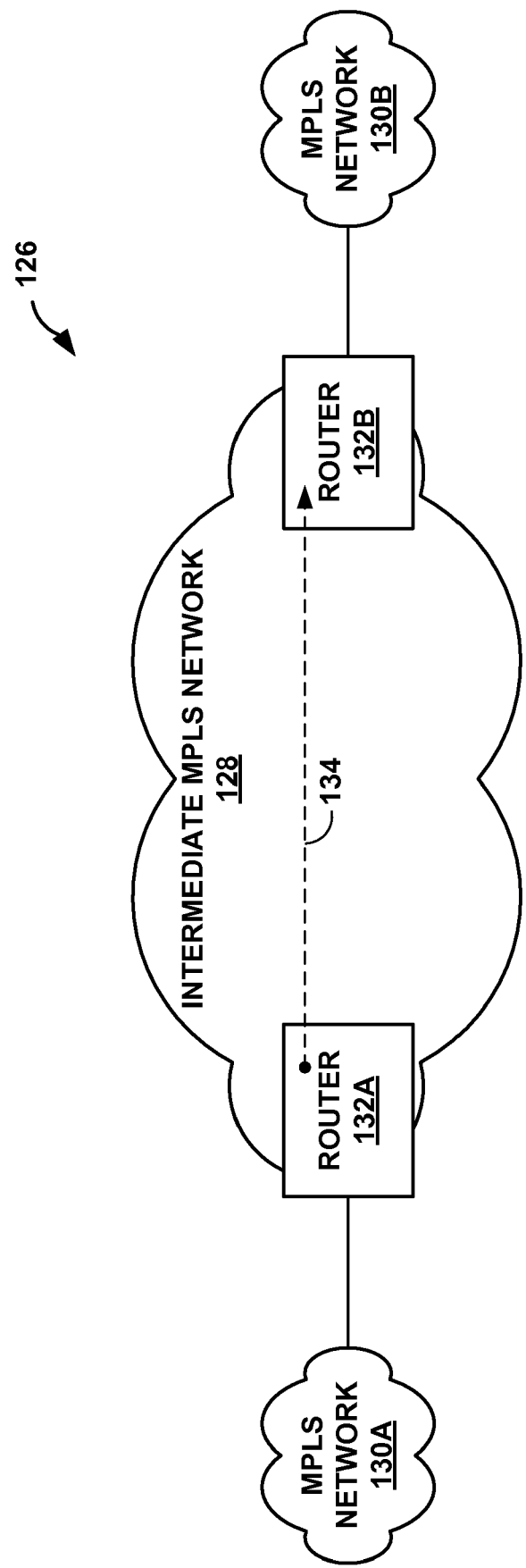
FIG. 6 is a block diagram illustrating another exemplary network system that implements the techniques described in this disclosure.

FIG. 6 is a block diagram illustrating another exemplary network system 126 that implements the techniques described in this disclosure. Network system 126 includes an intermediate Multi-Protocol Label Switching (MPLS) network 128 and MPLS networks 130A, 130B ("MPLS networks 130"). Intermediate MPLS network 128 includes routers 132A, 132B ("routers 132"), where one of or both of routers 132 may implement the techniques described herein to facilitate the application of services to network traffic.

As described above, typically, a transit router positioned between an ingress and an egress router for an LSP, such as transit router 12B positioned between routers 12A and router 12C for LSP or path 18, implements the techniques, as filter 58 filters on MPLS labels not payload or other data not included in an MPLS header. However, in certain instances, such as the exemplary instance depicted in FIG. 6, an ingress router and/or egress router, e.g., one or both of routers 130, may implement the techniques to facilitate the application of services. Routers 130 may each, therefore, be substantially similar to router 12B, as depicted in FIG. 2, and implement the techniques using the architecture depicted in FIG. 3.

In the example of FIG. 6, network system 126 represents a carrier-of-carrier network topology. A carrier-of-carrier topology occurs where a service provider or other operators of MPLS networks 130 subscribe to or purchase a service from a core or intermediate service provider that operates intermediate MPLS network 128 positioned between MPLS networks 130. Intermediate MPLS network 128 may therefore receive network traffic from MPLS network 130A as one or more MPLS packets that include one or more labels. To carry this network traffic, router 132 may negotiate path 134 through MPLS network 128.

Router 132A, acting as an ingress router for path 134, may receive MPLS packets from MPLS network 130A. However, as these MPLS packets include packet labels, router 132A may apply a label filter, similar to label filter 58, dynamically generated based on a logical filter defined by configuration information, similar to configuration information 54, and installed in the forwarding plane of router 132A such that this label filter filters on labels included with MPLS packets received from MPLS network 130A. Router 132A may also dynamically maintain this label filter as described above to account for network flaps and other changes to a label space that may impact the label filter.

In this respect, router 132A may represent a transit router in that it provides a transit service for MPLS packets, much as router 12B provides a transit service for MPLS packets for a given LSP, although not with respect to a particular path. The techniques therefore should not be limited to any one type of router, e.g., ingress, egress, or transit types, but may be implemented by any type of router so long as the type of router receives MPLS packets and applies a label filter that filters on the labels of the MPLS packets rather than the payload or other data of the packet not included within the MPLS header.

While described above with respect to network environments involving, in some form, a transit network, the techniques may also apply to edge networks, such as those provided by service providers. As an example, in edge networks, such as those that provide Digital Subscriber Line (DSL) services to customers, traditionally a Broadband Network Gateway (BNG), e.g., an IP router, a subscriber has to be modeled as an entity, e.g., a logical interface, in the forwarding/services plane so that actions, such as call admission and billing, can be carried out for the subscriber. The techniques may apply in this DSL environment to enable the IP routers acting as BNGs to carry MPLS all the way to the edge, e.g., to IP router acting as the BNG, and represent each subscriber as a distinct MPLS label stack or a route. That is, the techniques may enable the traditional call admission and billing, not by facilitating use of logical interfaces for each subscriber, but by providing the above described process by which MPLS filtering may occur. The techniques may filter on the individual label stacks assigned for each customer or subscriber and thereby provide for actions, such as call admission or billing, upon a filter match. In this respect, the techniques may facilitate scaling of BNG subscriber management and may enable BNGs to handle more subscribers, as MPLS filtering may be achieved more quickly than traditional filtering by way of logical interface in that MPLS filtering occurs in hardware while traditional filtering commonly occurs in software.

With respect to the above disclosure, MPLS notably has not yet been entirely formalized or ossified. New applications of MPLS are emerging that may modify or otherwise alter the techniques described herein. For example, new MPLS protocols are being developed for label assignment that may change the format or understanding of labels and thereby alter the techniques, such as the above described upstream label assignment that requires filtering one two or more labels or even an entire label stack. The upstream label assignment therefore may be considered to alter the construction of transforming the handle such that a handle may be transformed into two or more labels rather than a single label.

As another example, recently those responsible for developing MPLS have contemplated the use of context labels to provide more information concerning labels. Context labels may reside in the label stack adjacent to a label in the stack for which additional contextual information may be required for debugging, troubleshooting or other administrative purposes. The routers of an MPLS network may negotiate context labels much as these routers negotiate labels in order to agree on the format, number and other aspects of inserting these context labels into the label stack of MPLS packets. Alternatively, an administrator may configure each router with the particulars of each label context or, in yet another instance, the routers may determine format and other aspects of a context label from a device that maintains a label clearing house, e.g., a central database or provisioning system that defines all of the context labels. More information concerning context labels and their use within an MPLS network can be found in U.S. patent application Ser. No. 12/419,507, titled "Transmitting Packet Label Contexts within Computer Networks," by named inventors Kireeti Kompella et al., filed Apr. 7, 2009, herein incorporated by reference in its entirety.

To utilize these context labels, routing daemon 44 may communicate any context labels associated with a particular handle to service daemon 44 rather than the one or more labels. Service daemon 44 may then filter on the context labels rather than on the standard or typical labels. As these context labels may still comprise MPLS labels included within the label stack of the MPLS header, router 12B may still filter strictly or only on labels rather than on any information contained within the payload of the MPLS packet. In this sense, the property may comprise a context defined by a context label.

As yet another example, load-balancing or hash labels have also been proposed for use in MPLS. These load-balancing labels, which may also be referred to as "entropy labels," may not be used to determine to which FEC to forward, but may instead be used to better distribute network traffic loads when forwarding through an Equal-Cost Multi-Path (ECMP). The techniques may be implemented such that router 12B considers these entropy labels when dynamically generating the label filters. That is, filter 58 may for example include an entropy label as a filter label. Such entropy labels may also impact the forwarding of MPLS packets that include packet labels matching these filters having entropy filter labels. For example, if a match occurs, forwarding component 36 may forward the matching MPLS packet to a particular one of a plurality of service cards specified in the action field of filter 58. In this respect, the MPLS filtering mechanism described herein may utilize hash labels to steer matching MPLS packets to the same service card or service engine. More information regarding such entropy labels and their use in MPLS networks can be found in an Internet Draft, titled "The Use of Entropy Labels in MPLS Forwarding," by K. Kompella et al., dated Jul. 7, 2008, herein incorporated in its entirety by reference.

While MPLS may not be an ossified technology, MPLS traditionally changes at a rate slower than the rate at which new application and application protocols are developed. By filtering on the slower changing MPLS mechanism/labels, filtering may not require as much overhaul or updates to continually account for the changing and emerging application protocols. The techniques may therefore permit a more static or stable form of filtering that lessens costly updates to forwarding component 36 (which is often implemented as an Application Specific Integrated Circuit or ASIC).

Various embodiments of the invention have been described. These and other embodiments are within the scope of the following claims.

The invention claimed is:

1. A method comprising:
receiving, with a routing engine of a router of a network, input defining a filter that specifies (1) a user-defined handle that identifies a property common to a plurality of packets of a particular context, and (2) one or more services to be applied to the plurality of packets; with the routing engine, automatically installing the filter within a service plane of the router;

maintaining, with the routing engine, data that defines an association between the handle and one or more Multi-Protocol Label Switching (MPLS) labels assigned to forward the plurality of packets of the particular context along a label switched patch (LSP); with the routing engine, automatically generating and installing within a forwarding plane of the router a forwarding-plane filter that specifies one or more of the MPLS labels for filtering the network traffic;

applying, with the forwarding plane, the automatically generated forwarding-plane filter to an incoming MPLS packet of the network traffic to inspect only a label stack of the incoming packet without inspecting a remaining portion of a header and a payload of the packet to determine whether the label stack of the MPLS packet contains any of the one or more MPLS labels;

when the MPLS packet contains any of the MPLS labels of the filter, forwarding the MPLS packet and additional context information from the forwarding plane to the service plane of the router;

with the services plane of the router, applying the filter to the packet to select one or more of the services based on the additional context information received from the forwarding plane; and applying, with the service plane, the selected one or more of the services to the incoming MPLS packet received from the forwarding plane.

2. The method of claim 1, wherein the additional context information comprises data identifying the filter installed within the service plane corresponding to the forwarding-plane filter of the forwarding plane that matched the MPLS packet.

3. The method of claim 1,
wherein the handle comprises one of a plurality of handles, and
wherein the one or more services comprises one or more of a plurality of services,
the method further comprising:
presenting, with the router, the plurality of handles and the plurality of services via at least one user interface to a user,
wherein receiving the input comprises receiving configuration information that defines the filter from the user indicating the one of the plurality of handles and the one or more of the plurality of services selected by the user via the at least one user interface.

4. The method of claim 3, wherein the configuration information specifies a filter name by which to identify the filter, a conditional field that defines the one of the plurality of handles selected by the user, and an action field by which to specify the one or more of the plurality of services selected by the user.

5. The method of claim 1, further comprising:
forwarding, with the service plane of the router, the incoming MPLS packet back to the forwarding plane based on the application of the selected one or more services to the incoming MPLS packet; and
forwarding, with the forwarding plane of the router, the incoming MPLS packet to a next hop based on the MPLS label of the incoming MPLS packet.

6. The method of claim 1, further comprising forwarding, when the MPLS packet does not contain any of the MPLS labels of the filter, the incoming MPLS packet with the forwarding plane of the router to a next hop associated with the MPLS label of the incoming MPLS packet without forwarding the MPLS packet to the service plane.

7. The method of claim 1, wherein maintaining the association comprises:
   receiving an advertisement that updates one or more label mappings between one of the one or more MPLS labels and a Forwarding Equivalence Class (FEC); and
   dynamically updating, in response to the change to the one or more label mappings, the data defining the association between the handle and the one or more MPLS labels to disassociate one or more of the MPLS labels from the handle or add additional MPLS labels to the one or more MPLS labels associated with the handle.

8. The method of claim 7,
   wherein automatically generating the forwarding-plane filter comprises automatically regenerating the forwarding-plane filter in response to the dynamic update of the data defining the association such that the regenerated filter includes the updated one or more MPLS labels, and
   wherein installing the forwarding-plane filter comprises installing the regenerated forwarding-plane filter within the forwarding plane of the router.

9. The method of claim 1, wherein the property includes one or more a Label Switched Path (LSP) name, a Forwarding Equivalence Class (FEC) identifier (ID) associated with a downstream assigned label, a FEC ID associated with an upstream assigned label, a Virtual Private Large Area Network (LAN) Service (VPLS) site ID, a Layer Two (2) Virtual Private Network (L2VPN) site ID, a Layer three (3) VPN (L3VPN) routing instance name together with a VPN prefix, a context defined by a context label, a property learned from a provisioning system, or a Circuit Cross-Connect (CCC) ID.

10. The method of claim 1, wherein applying the selected one or more services comprises applying one or more of a Network Address Translation (NAT) service, a firewall service, an anti-virus service, a service for counting the packets, a service for time stamping the packets, a service for sampling the packets, a service for performing accounting actions, a service for dropping the packets, a service for policing one or more flows associated with the packets, a service for performing a more detailed look-up on the packets, a service for taking distinct Class of Service (CoS) actions, a service for aggregating the one or more flows, a service for targeted ad-insertion, and a service for Bayesian analysis on these packets that are encrypted.

11. The method of claim 1,
   wherein the one or more labels of the forwarding-plane filter comprise one or more Multi-Protocol Label Switching (MPLS) labels,
   wherein the label comprises a MPLS label,
   wherein the router comprises a Label Switching Router (LSR),
   wherein the incoming packet comprises a Multi-Protocol Label Switching (MPLS) packet that includes an MPLS header having a label stack that stores the MPLS label, and
   wherein applying the automatically generated forwarding-plane filter to the incoming MPLS packet comprises applying the automatically generated forwarding-plane filter to the MPLS packet to determine whether the MPLS label of the MPLS packet matches any of the one or more MPLS labels of the forwarding-plane filter, and
   wherein applying the selected one or more services comprises applying the selected one or more services to a payload of the MPLS packet.

12. The method of claim 1,
   wherein the router implements the forwarding plane in an Application Specific Integrated Circuit (ASIC), and
   wherein the router implements at least a portion of the service plane by executing software.

13. A router comprising:
   a service plane;
   a forwarding plane; and
   a routing engine that receives input defining a filter that specifies (1) a user-defined handle that identifies a property common to a plurality of packets of a particular context, and (2) one or more services to be applied to the plurality of packets, automatically installs the filter within the service plane, maintains data that defines an association between the handle and one or more Multi-Protocol Label Switching (MPLS) labels assigned to forward the plurality of packets of the particular context along a label switched patch (LSP), automatically generates a forwarding-plane filter, and installs within the forwarding plane the forwarding-plane filter that specifies one or more of the MPLS labels for filtering the network traffic,
   wherein the forwarding plane includes a forwarding component that applies the automatically generated forwarding-plane filter to an incoming MPLS packet of the network traffic to inspect only a label stack of the incoming packet without inspecting a remaining portion of a header and a payload of the packet to determine whether the label stack of the MPLS packet contains any of the one or more MPLS labels and, when the MPLS packet contains any of the MPLS labels of the filter, forwards the MPLS packet and additional context information to the service plane, and
   wherein the service plane includes at least one service card that applies the filter to the packet to select one or more of the services based on the additional context information received from the forwarding plane and applies the selected one or more of the services to the incoming MPLS packet received from the forwarding plane.

14. The router of claim 13, wherein the additional context information comprises data identifying the filter installed within the service plane corresponding to the forwarding-plane filter of the forwarding plane that matched the MPLS packet.

15. The router of claim 13,
   wherein the handle comprises one of a plurality of handles, and
   wherein the services comprises one or more of a plurality of services,
   wherein the routing engine includes a user interface module that presents the plurality of handles and the plurality of services via at least one user interface to a user and receives configuration information that defines the filter from the user indicating the one of the plurality of handles and the one or more of the plurality of services selected by the user.

16. The router of claim 15, wherein the configuration information specifies a filter name by which to identify the filter, a conditional field that defines the one of the plurality of handles selected by the user, and an action field by which to specify the one or more of the plurality of services selected by the user.

17. The router of claim 13,
   wherein the routing engine further comprises:
   a routing daemon that maintains the data defining the association; and a service daemon that automatically generates and installs the forwarding-plane filter the filter in the forwarding component.

18. The router of claim 13,
wherein the at least one service card forwards the incoming MPLS packet back to the forwarding component based on the application of the selected one or more services to the incoming MPLS packet, and
wherein the forwarding component forwards the incoming packet to a next hop based on the MPLS label of the incoming MPLS packet.

19. The router of claim 13, wherein the forwarding component forwards, when the MPLS packet does not contain any of the MPLS labels of the filter, the incoming MPLS packet to a next hop associated with the MPLS label of the incoming MPLS packet without forwarding the MPLS packet to the service plane.

20. The router of claim 13, wherein the routing engine includes a routing daemon that receives an advertisement changing one or more label mappings between one of the one or more MPLS labels and a Forwarding Equivalence Class (FEC) and dynamically updates, in response to the change to the one or more label mappings, the association between the handle and the one or more MPLS labels to disassociate one or more of the MPLS labels from the handle or add additional MPLS labels to the one or more MPLS labels associated with the handle.

21. The router of claim 20, wherein the routing engine includes a service daemon that automatically regenerates the filter in response to the dynamic update of the data defining association such that the regenerated filter includes the updated one or more MPLS labels and installs the regenerated forwarding-plane filter within the forwarding plane of the router.

22. The router of claim 13, wherein the property includes one or more a Label Switched Path (LSP) name, a Forwarding Equivalence Class (FEC) identifier (ID) associated with a downstream assigned label, a FEC ID associated with an upstream assigned label, a Virtual Private Large Area Network (LAN) Service (VPLS) site ID, a Layer Two (2) Virtual Private Network (L2VPN) site ID, a Layer three (3) VPN (L3VPN) routing instance name together with a VPN prefix, a context defined by a context label, a property learned from a provisioning system, or a Circuit Cross-Connect (CCC) ID.

23. The router of claim 13, wherein the at least one service card applies one or more of a Network Address Translation (NAT) service, a firewall service, an anti-virus service, a service for counting the packets, a service for time stamping the packets, a service for sampling the packets, a service for performing accounting actions, a service for dropping the packets, a service for policing one or more flows associated with the packets, a service for performing a more detailed look-up on the packets, a service for taking distinct Class of Service (CoS) actions, a service for aggregating the one or more flows, a service for targeted ad-insertion, and a service for Bayesian analysis on these packets that are encrypted.

24. The router of claim 13,
wherein the one or more labels of the forwarding-plane filter comprise one or more Multi-Protocol Label Switching (MPLS) labels,
wherein the label comprises a MPLS label,
wherein the router comprises a Label Switching Router (LSR),
wherein the incoming packet comprises a Multi-Protocol Label Switching (MPLS) packet that includes an MPLS header having a label stack that stores the MPLS label, and
wherein the forwarding component applies the automatically generated forwarding plane filter to the MPLS packet to determine whether the MPLS label matches any of the one or more MPLS labels of the forwarding-plane filter, and
wherein the at least one service card applies the selected on or more services to a payload of the MPLS packet.

25. The router of claim 13,
wherein the forwarding plane is implemented in an Application Specific Integrated Circuit (ASIC), and
wherein the at least one service card executes software to apply the filter to the packet to select one or more of the services based on the additional context information received from the forwarding plane and apply the selected one or more of the services to the incoming MPLS packet received from the forwarding plane.

26. A network system comprising:
a customer network; and
a packet-based network coupled to the customer network that employs a label switching protocol to establish paths by which to forward data, wherein the packet-based network includes a router comprising:
a service plane;
a forwarding plane; and
a routing engine that receives input defining a filter that specifies (1) a user-defined handle that identifies a property common to a plurality of packets of a particular context, and (2) one or more services to be applied to the plurality of packets, automatically installs the filter within the service plane, maintains data that defines an association between the handle and one or more Multi-Protocol Label Switching (MPLS) labels assigned to forward the plurality of packets of the particular context along a label switched patch (LSP), automatically generates a forwarding-plane filter, and installs within the forwarding plane the forwarding-plane filter that specifies one or more of the MPLS labels for filtering the network traffic,
wherein the forwarding plane includes a forwarding component that applies the automatically generated forwarding-plane filter to an incoming MPLS packet of the network traffic to inspect only a label stack of the incoming packet without inspecting a remaining portion of a header and a payload of the packet to determine whether the label stack of the MPLS packet contains any of the one or more MPLS labels and, when the MPLS packet contains any of the MPLS labels of the filter, forwards the MPLS packet and additional context information to the service plane, and
wherein the service plane includes at least one service card that applies the filter to the packet to select one or more of the services based on the additional context information received from the forwarding plane and applies the selected one or more of the services to the incoming MPLS packet received from the forwarding plane.

27. The network system of claim 26, wherein the additional context information comprises data identifying the filter installed within the service plane corresponding to the forwarding-plane filter of the forwarding plane that matched the MPLS packet.

28. The network system of claim 26,
wherein the handle comprises one of a plurality of handles, and
wherein the services comprises one or more of a plurality of services,
wherein the routing engine includes a user interface module that presents the plurality of handles and the plurality of services via at least one user interface to a user and receives configuration information that defines the filter from the user indicating the one of the plurality of handles and the one or more of the plurality of services selected by the user.

29. The method of claim 28, wherein the configuration information specifies a filter name by which to identify the filter, a conditional field that defines the one of the plurality of handles selected by the user, and an action field by which to specify the one or more of the plurality of services selected by the user.

30. The network system of claim 26,
wherein the routing engine further comprises:
a routing daemon that maintains the data defining the association; and
a service daemon that automatically generates and installs the forwarding-plane filter the filter in the forwarding component.

31. The network system of claim 26,
wherein the at least one service card forwards the incoming MPLS packet back to the forwarding component based on the application of the selected one or more services to the incoming MPLS packet, and
wherein the forwarding component forwards the incoming packet to a next hop based on the MPLS label of the incoming MPLS packet.

32. The network system of claim 26, wherein the forwarding component forwards, when the MPLS packet does not contain any of the MPLS labels of the filter, the incoming MPLS packet to a next hop associated with the MPLS label of the incoming MPLS packet without forwarding the MPLS packet to the service plane.

33. The network system of claim 26, wherein the routing engine includes a routing daemon that receives an advertisement changing one or more label mappings between one of the one or more MPLS labels and a Forwarding Equivalence Class (FEC) and dynamically updates, in response to the change to the one or more label mappings, the association between the handle and the one or more MPLS labels to disassociate one or more of the MPLS labels from the handle or add additional MPLS labels to the one or more MPLS labels associated with the handle.

34. The network system of claim 33, wherein the routing engine includes a service daemon that automatically regenerates the filter in response to the dynamic update of the data defining association such that the regenerated filter includes the updated one or more MPLS labels and installs the regenerated forwarding-plane filter within the forwarding plane of the router.

35. The network system of claim 26, wherein the property includes one or more a Label Switched Path (LSP) name, a Forwarding Equivalence Class (FEC) identifier (ID) associated with a downstream assigned label, a FEC ID associated with an upstream assigned label, a Virtual Private Large Area Network (LAN) Service (VPLS) site ID, a Layer Two (2) Virtual Private Network (L2VPN) site ID, a Layer three (3) VPN (L3VPN) routing instance name together with a VPN prefix, a context defined by a context label, a property learned from a provisioning system, or a Circuit Cross-Connect (CCC) ID.

36. The network system of claim 26, wherein the at least one service card applies one or more of a Network Address Translation (NAT) service, a firewall service, an anti-virus service, a service for counting the packets, a service for time stamping the packets, a service for sampling the packets, a service for performing accounting actions, a service for dropping the packets, a service for policing one or more flows associated with the packets, a service for performing a more detailed look-up on the packets, a service for taking distinct Class of Service (CoS) actions, a service for aggregating the one or more flows, a service for targeted ad-insertion, and a service for Bayesian analysis on these packets that are encrypted.

37. The network system of claim 26,
wherein the one or more labels of the forwarding-plane filter comprise one or more Multi-Protocol Label Switching (MPLS) labels,
wherein the label comprises a MPLS label,
wherein the router comprises a Label Switching Router (LSR),
wherein the incoming packet comprises a Multi-Protocol Label Switching (MPLS) packet that includes an MPLS header having a label stack that stores the MPLS label, and
wherein the forwarding component applies the automatically generated forwarding plane filter to the MPLS packet to determine whether the MPLS label matches any of the one or more MPLS labels of the forwarding-plane filter, and
wherein the at least one service card applies the selected on or more services to a payload of the MPLS packet.

38. The network system of claim 26,
wherein the customer network comprises a first Multi-Protocol Label Switching (MPLS) network that employs an MPLS signaling protocol to establish paths by which to forward data;
wherein the packet-based network comprises a second intermediate MPLS network that employs the MPLS signaling protocol to establish paths by which to forward the data;
wherein the one or more labels of the forwarding-plane filter comprise one or more Multi-Protocol Label Switching (MPLS) labels,
wherein the label comprises a MPLS label,
wherein the router comprises a Label Switching Router (LSR),
wherein the incoming packet comprises a Multi-Protocol Label Switching (MPLS) packet that includes an MPLS header having a label stack that stores the MPLS label, and
wherein the forwarding component applies the automatically generated forwarding plane filter to the MPLS packet to determine whether the MPLS label matches any of the one or more MPLS labels of the forwarding-plane filter, and
wherein the at least one service card applies the selected on or more services to a payload of the MPLS packet.

39. The network system of claim 26,
wherein the forwarding plane is implemented in an Application Specific Integrated Circuit (ASIC), and
wherein the at least one service card executes software to apply the filter to the packet to select one or more of the services based on the additional context information received from the forwarding plane and apply the selected one or more of the services to the incoming MPLS packet received from the forwarding plane.

40. The network system of claim 26,
wherein the packet-based network comprises an Multi-Protocol Label Switching (MPLS) Virtual Private Network (VPN), and
wherein the router comprises a provider router (P-router).

41. The network system of claim 26, wherein the at least one service card further applies an MPLS security (MPLS-SEC) service to the incoming MPLS packet received from the forwarding plane.

42. A non-transitory computer-readable storage medium comprising instructions for causing a programmable processor to:

receive, with a routing engine of a router of a network, input defining a filter that specifies (1) a user-defined handle that identifies a property common to a plurality of packets of a particular context, and (2) one or more services to be applied to the plurality of packets; with the routing engine, automatically install the filter within a service plane of the router;

maintain, with the routing engine, data that defines an association between the handle and one or more Multi-Protocol Label Switching (MPLS) labels assigned to forward the plurality of packets of the particular context along a label switched patch (LSP);

with the routing engine, automatically generate and install within a forwarding plane of the router a forwarding-plane filter that specifies one or more of the MPLS labels for filtering the network traffic;

apply, with the forwarding plane, the automatically generated forwarding-plane filter to an incoming MPLS packet of the network traffic to inspect only a label stack of the incoming packet without inspecting a remaining portion of a header and a payload of the packet to determine whether the label stack of the MPLS packet contains any of the one or more MPLS labels;

when the MPLS packet contains any of the MPLS labels of the filter, forward the MPLS packet and additional context information from the forwarding plane to the service plane of the router;

with the services plane of the router, apply the filter to the packet to select one or more of the services based on the additional context information received from the forwarding plane; and apply, with the service plane, the selected one or more of the services to the incoming MPLS packet received from the forwarding plane.

\* \* \* \* \*